(12) United States Patent
Tanaka et al.

(10) Patent No.: US 8,446,422 B2
(45) Date of Patent: May 21, 2013

(54) IMAGE DISPLAY APPARATUS, IMAGE DISPLAY METHOD, PROGRAM, AND RECORD MEDIUM

(75) Inventors: Kazumasa Tanaka, Chiba (JP); Tetsujiro Kondo, Tokyo (JP); Yasushi Tatehira, Kanagawa (JP); Tetsushi Kokubo, Kanagawa (JP); Kenji Tanaka, Kanagawa (JP); Hitoshi Mukai, Kanagawa (JP); Hirofumi Hibi, Kanagawa (JP); Hiroyuki Morisaki, Tokyo (JP)

(73) Assignee: Sony Corporation, Tokyo (JP)

( * ) Notice: Subject to any disclaimer, the term of this patent is extended or adjusted under 35 U.S.C. 154(b) by 977 days.

(21) Appl. No.: 12/356,937

(22) Filed: Jan. 21, 2009

(65) Prior Publication Data

US 2009/0201314 A1    Aug. 13, 2009

(30) Foreign Application Priority Data

Feb. 13, 2008    (JP) ................................. 2008-032176

(51) Int. Cl.
*G09G 5/00* (2006.01)
*G06K 9/62* (2006.01)
*G06F 3/048* (2006.01)

(52) U.S. Cl.
USPC ........... 345/581; 345/660; 382/161; 715/794; 715/796

(58) Field of Classification Search
None
See application file for complete search history.

(56) References Cited

U.S. PATENT DOCUMENTS

| | | | | |
|---|---|---|---|---|
| 5,487,172 | A * | 1/1996 | Hyatt | 712/32 |
| 5,686,940 | A | 11/1997 | Kuga | |
| 5,729,704 | A * | 3/1998 | Stone et al. | 715/804 |
| 7,124,359 | B2 * | 10/2006 | Suzuki et al. | 715/202 |
| 7,370,279 | B2 * | 5/2008 | Sugimoto | 715/760 |
| 7,433,518 | B2 * | 10/2008 | Shiratani | 382/190 |
| 7,542,994 | B2 * | 6/2009 | Anderson | 1/1 |
| 7,557,818 | B1 * | 7/2009 | Ubillos et al. | 345/684 |
| 2003/0167447 | A1 * | 9/2003 | Hatta et al. | 715/517 |
| 2005/0105806 | A1 * | 5/2005 | Nagaoka et al. | 382/224 |
| 2007/0035551 | A1 * | 2/2007 | Ubillos | 345/581 |
| 2007/0171238 | A1 | 7/2007 | Ubillos et al. | |

(Continued)

FOREIGN PATENT DOCUMENTS

EP    1 679 689 A1    7/2006
JP    2001-111947    4/2001

(Continued)

OTHER PUBLICATIONS

Partial European Search Report issued Jun. 8, 2012 in Application No. 09152704.4.

(Continued)

*Primary Examiner* — Ke Xiao
*Assistant Examiner* — Donna Ricks
(74) *Attorney, Agent, or Firm* — Oblon, Spivak, McClelland, Maier & Neustadt, L.L.P.

(57) ABSTRACT

An image display apparatus is disclosed. The image display apparatus includes a detection section, an image forming section, and a display process section. The detection section detects a user's watching state. The image forming section that forms a display image which is displayed on a screen based on a plurality of images and changes the display image based on a detected result of the detection section. The display process section which performs a process of displaying the display image formed by the image forming section.

17 Claims, 18 Drawing Sheets

U.S. PATENT DOCUMENTS

| | | |
|---|---|---|
| 2007/0211027 A1 | 9/2007 | Ohta |
| 2008/0034302 A1* | 2/2008 | Ryu et al. .................... 715/763 |
| 2008/0148176 A1* | 6/2008 | Mita ............................ 715/781 |

FOREIGN PATENT DOCUMENTS

| | | |
|---|---|---|
| JP | 2003-52004 | 2/2003 |
| JP | 2004-260412 | 9/2004 |
| JP | 2005-122100 | 5/2005 |
| JP | 2005-236646 | 9/2005 |
| JP | 2006-86717 | 3/2006 |
| JP | 2007-11562 | 1/2007 |
| JP | 2007-143093 | 6/2007 |
| JP | 2007-213469 | 8/2007 |
| JP | 2007-264006 | 10/2007 |
| JP | 2007-322452 | 12/2007 |
| WO | WO 2008/007703 A1 | 1/2008 |

OTHER PUBLICATIONS

Robert Van Liere, et al., "Exploration of Large Image Collections Using Virtual Reality Devices", Eighth International Conference on Information and Knowledge Management, XP040110950, Nov. 6, 1999, pp. 83-86.

Office Action issued Nov. 13, 2012 in Japanese Patent Application No. 2008-032176.

* cited by examiner

☐ PHOTOGRAPHER A   ☐ PHOTOGRAPHER D
☐ PHOTOGRAPHER B   ☐ PHOTOGRAPHER E
☐ PHOTOGRAPHER C   ☐ PHOTOGRAPHER F

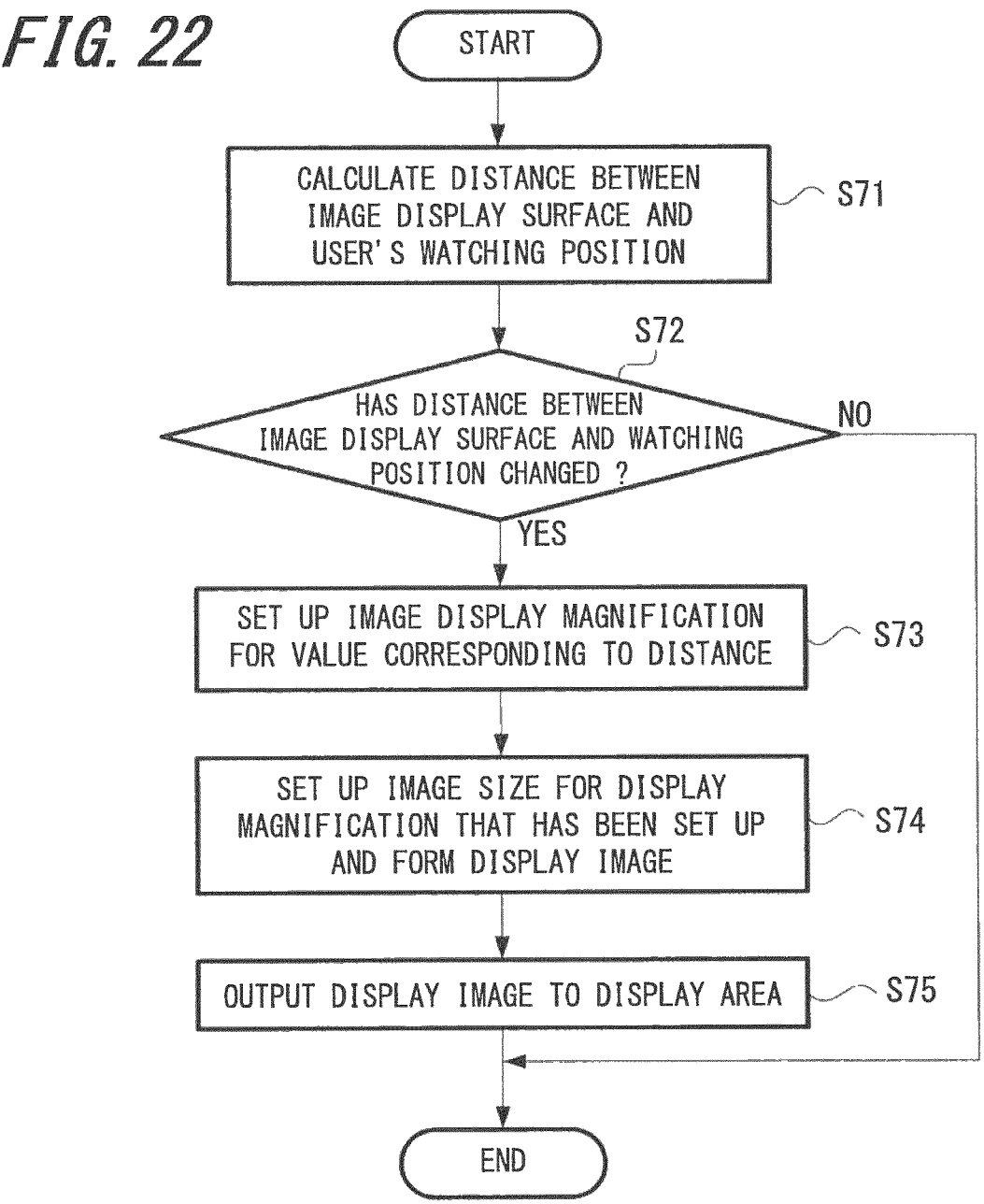

IMAGE DISPLAY APPARATUS, IMAGE DISPLAY METHOD, PROGRAM, AND RECORD MEDIUM

CROSS REFERENCES TO RELATED APPLICATIONS

The present invention contains subject matter related to Japanese Patent Application JP 2008-032176 filed in the Japanese Patent Office on Feb. 13, 2008, the entire contents of which being incorporated herein by reference.

BACKGROUND OF THE INVENTION

1. Field of the Invention

The present invention relates to an image display apparatus, an image display method, a program, and a record medium, and in particular, relates to techniques suitable to display a plurality of images on a large wall-size screen.

2. Description of the Related Art

As digital still cameras, video cameras, and mobile telephone terminals having a camera function have become common in recent years, everybody can capture still images and moving images with ease. In addition, since the storage capacity of record media of image data captured is increasing, the amounts of captured images recorded on these record mediums tend to become huge. Thus, watching captured images that have been quantitatively recorded takes time and effort.

To solve such a problem, the above-mentioned image capturing apparatus is connected to a display such as a television receiver, and a list of thumbnails of a plurality of captured images is displayed on the screen of the display. In this case, a display method and a key operation method are devised so that the user can quickly retrieve his or her desired image.

Japanese Unexamined Patent Application Publication No. 2004-260412, referred to as Patent Document 1, describes a technique of allowing the user to access a desired image from a list of thumbnail images on the display with small number of key operations.

SUMMARY OF THE INVENTION

The screen sizes of television receivers are becoming large year after year. Television receivers having a screen exceeding 100 inches have been placed on the market. In addition, highly precise displays have been developed and television receivers having a screen with a resolution of 1920 (W) pixels×1080 (H) pixels, called full high definition (HD) or full high-vision, have been commercialized. In near future, it is said that television receivers having a screen with a resolution of 4000 (W) pixels×2000 (H) pixels, called 2K4K, will appear. In addition, since the use of home projectors is increasing, it can be said that large screens for still images and moving images are fitting into people's lifestyle.

When a large number of images captured by the foregoing apparatus are displayed on such a large size display, the user can look over each image displayed on the screen. It is believed that information obtained by looking over an image is different from information obtained at a position close to the screen in their quality. Thus, it is thought that if the display method on a large screen is devised, information that is difficult to be displayed on a regular size screen can be displayed. However, so far, a display method based on such a view point has not been proposed.

In view of the foregoing, it would be desirable to allow the user to effectively watch a plurality of images as a list displayed on a screen.

According to an embodiment of the present invention, there is provided an image display apparatus. The image display apparatus includes a detection section, an image forming section, and a display process section. The detection section detects a user's watching state. The image forming section forms a display image which is displayed on a screen based on a plurality of images and changes the display image based on a detected result of the detection section. The display process section performs a process of displaying the display image formed by the image forming section.

Thus, a display image on a screen is changed depending on whether the watching position of the user is close to or far from the screen.

According to an embodiment of the present invention, since a display image on the screen is changed depending on his or her watching state, he or she can effectively watch the display content of the image on the screen.

BRIEF DESCRIPTION OF THE DRAWINGS

The invention will become more fully understood from the following detailed description, taken in conjunction with the accompanying drawings, wherein similar reference numerals denote corresponding elements, in which:

FIG. 14A shows the selected image and FIG. 14B shows an example of a display in the display area;

FIG. 17A shows the state in which the user has selected an image and FIG. 17B shows the state in which images having higher degrees of correlation with the selected image are highlighted;

FIG. 18A shows the state in which images having higher degrees of correlation with the image selected by the user are displayed behind the other images and FIG. 18B shows the state in which images having higher degrees of correlation with the image selected by the user are displayed on the foreground plane;

FIG. 19A shows the state in which the images have not been moved and FIG. 19B shows the state in which they have been moved;

FIG. 22 is a flowchart showing an example of a process of changing the size and arrangement positions of images corresponding to a user's watching position according to the second embodiment of the present invention;

FIG. 23A shows an example of a display in which the user's watching position is far, FIG. 23B shows an example of a display in which the user's watching position is nearer than that shown in FIG. 23A, and FIG. 23C shows an example of a display in which the user's watching position is near;

FIG. 24A shows the state in which the arrangement positions have not been moved, FIG. 24B shows the state in which they are being moved, FIG. 24C shows the state in which they have been moved.

DETAILED DESCRIPTION OF THE PREFERRED EMBODIMENTS

Next, with reference to FIG. 1 to FIG. 20, a first embodiment of the present invention will be described. In this example, the user displays a large number of images captured by a digital still camera as a list on a large display such that he or she can effectively watch them. In this embodiment, "large size" represents a size that exceeds the field of view of the user who is watching the screen. For example, "large size" represents a size that occupies a full wall having, for example, a diagonal size of 100 inches.

In this case, since each image displayed as a list on the screen is not formed as a thumbnail and has a captured image size, the resolution of each image can be maintained. Thus, the user can check for detail information of each image from the list. The user may be able to designate a display size of each image.

The display of this embodiment may be of any shape as long as it is large. The display may be a rear-projection type display, a plasma display, a liquid crystal display, or the like. Instead, the display may be a screen formed by a front projector. In this embodiment, images captured by a digital still camera are displayed as a list. Instead, images captured by other devices such as a video camera and/or a portable telephone terminal may be used. Instead, each television broadcast program may be displayed instead of captured images.

Figure 1:
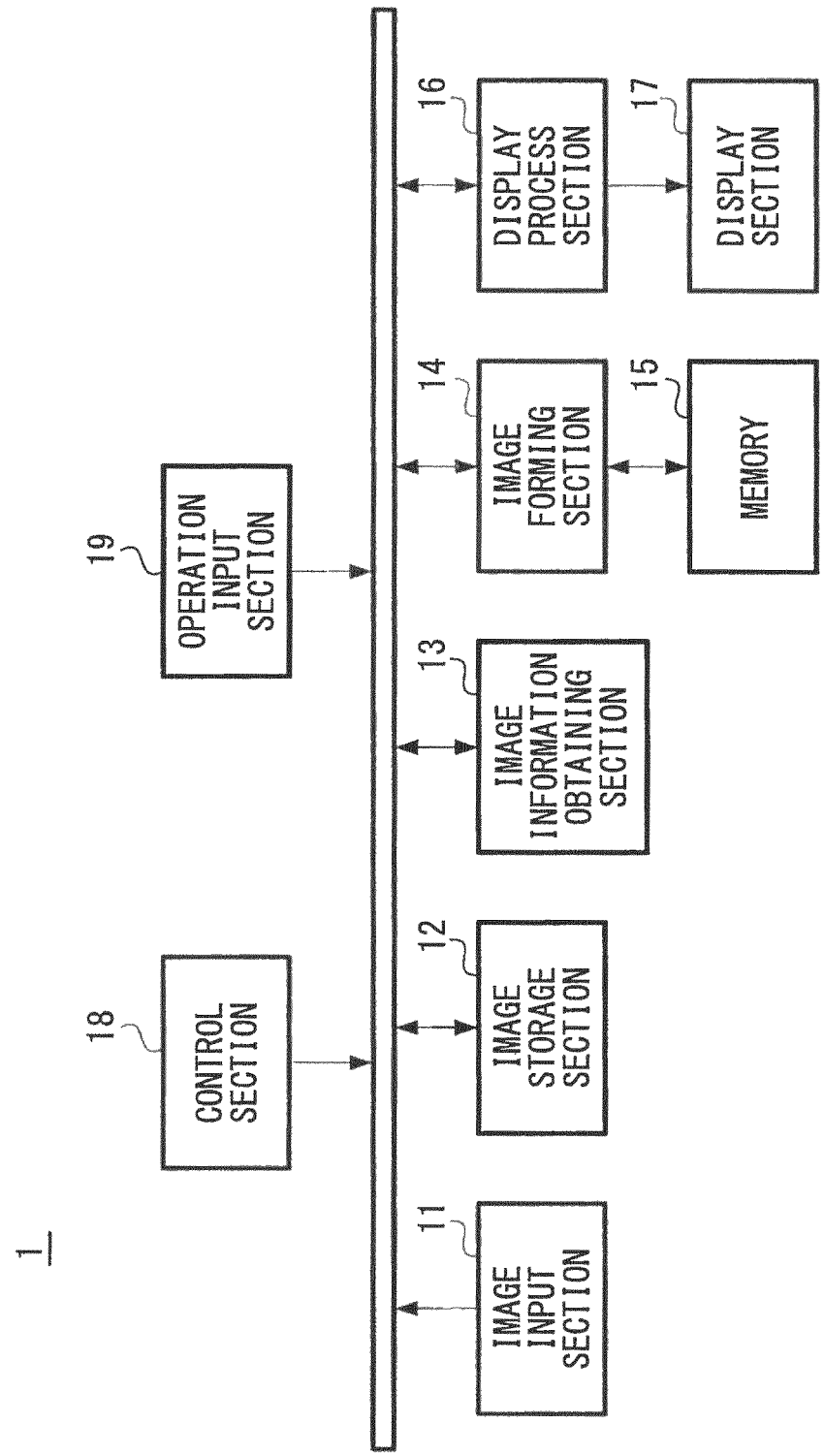
FIG. 1 is a block diagram showing an example of an internal structure of an image display apparatus according to a first embodiment of the present invention.

FIG. 1 is a schematic diagram showing an example of a structure of an image display apparatus 1 according to this embodiment. The image display apparatus 1 shown in FIG. 1 includes an image input section 11, an image storage section 12, an image information obtaining section 13, an image forming section 14, a memory 15, a display process section 16, a display section 17, a control section 18, and an operation input section 19.

The image input section 11 accepts an input of image data captured by a digital still camera or the like and outputs the input image data to the image storage section 12. The image storage section 12 is composed, for example, of a hard disk drive (HDD), a digital versatile disc (DVD), or the like and stores images that are input from the image input section 11.

The image information obtaining section 13 reads meta data (attribute information) from each of images that compose image data stored in the image storage section 12 and extracts capture date/time, photographer information (owner information), and so forth therefrom. As meta data, an image file described, for example, in the exchangeable image file format (exif) is referred. If positioning information of the global positioning system (GPS) has been added to meta data, this information may be obtained as capture position information.

The image forming section 14 reads image data from the image storage section 12 or those that have been input to the image input section 11 and forms a display image to be displayed on the display section 17. The arrangement of images that compose a display image may be set up at random, in the order of capture dates and times, and so forth. The arrangement of images may have been decided as initial setting or be designated by the user.

The memory 15 is used to temporarily store image data that are being processed when the image forming section 14 forms a display image. The memory 15 is composed of a semiconductor memory or the like. The display process section 16 performs a process of displaying a display image on the display section 17. The display section 17 is a display that displays a display image generated by the image forming section 14. As described above, the display section 17 is composed of a rear projection type display, a plasma display, a liquid crystal display, or the like.

The control section 18 includes a micro processing unit (MPU) and so forth. The control section 18 controls each section of the image display apparatus 1. The operation input section 19 includes buttons, levers, a keyboard, and/or a mouse. The control section 18 generates an operation signal according to a user's operation input and outputs the generated operation signal to the control section 18.

Figure 2:
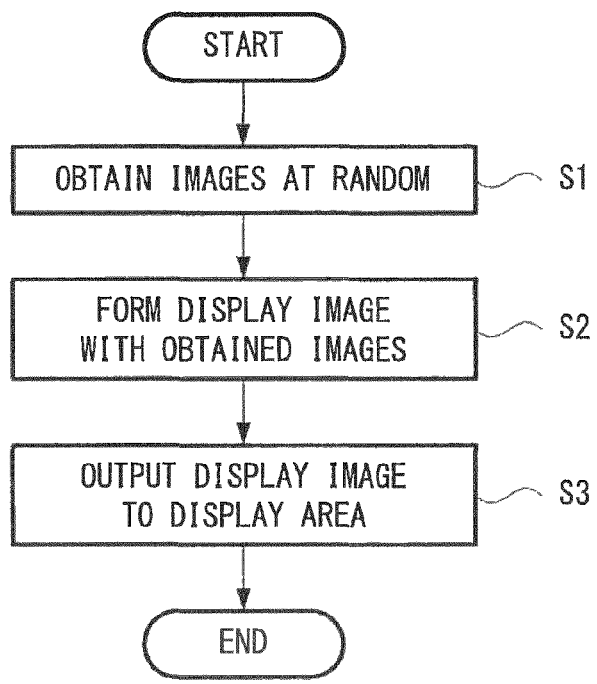
FIG. 2 is a flowchart showing an example of a process of displaying images at random as a list according to a first embodiment of the present invention.

Next, with reference to a flowchart shown in FIG. 2, an example of a process of displaying a plurality of images at random on the display section 17, performed by the image display apparatus 1, will be described. In FIG. 2, the image forming section 14 reads images from the image input section 11 in the input order if they are input to the image input section 11 or reads images from the image storage section 12 at random if they have been stored in the image storage section 12 (at step S1). The image forming section 14 forms a display image to be displayed with the obtained images (at step S2). The image forming section 14 outputs the formed display image to the display section 17 (in a display area) (at step S3).

Figure 3:
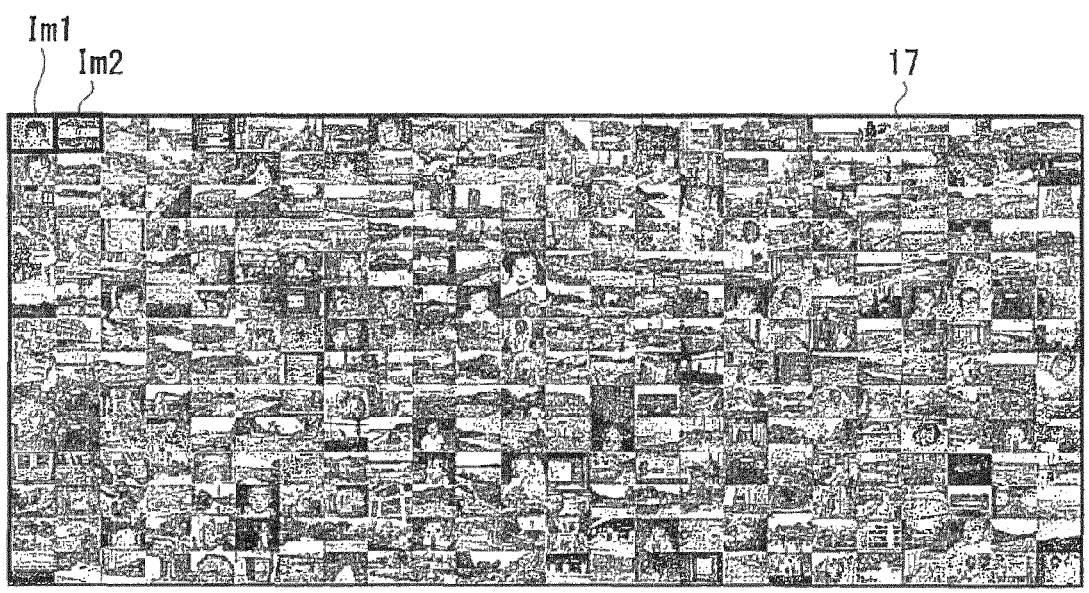
FIG. 3 is a schematic diagram showing an example of a display of images at random as a list according to the first embodiment of the present invention.

FIG. 3 shows an example of a display image generated in the process shown in FIG. 2 and displayed on the display section 17. Many images are arranged and displayed on the display section 17. In FIG. 3, a total of 336 images of 14 images (W)×24 images (H) are arranged. In addition, the images are arranged at random, for example, image Im1 of a child is arranged at the upper left end of the screen and image Im2 of a scene is arranged on the right of image Im1. In the following description, images are simply denoted by image Im unless they are necessary to be distinguished.

The display size of each image Im shown in FIG. 3 is the size of a captured image. In other words, each image Im has not been formed as a thumbnail. Thus, each image is clearly displayed with a high resolution. As a result, the user can carefully watch each of images Im displayed as a list on a large screen.

Since many images Im are displayed as a list on a large screen, a watching method of a display image composed of many images Im like new content that the user can enjoy may be provided to him or her.

Figure 4:
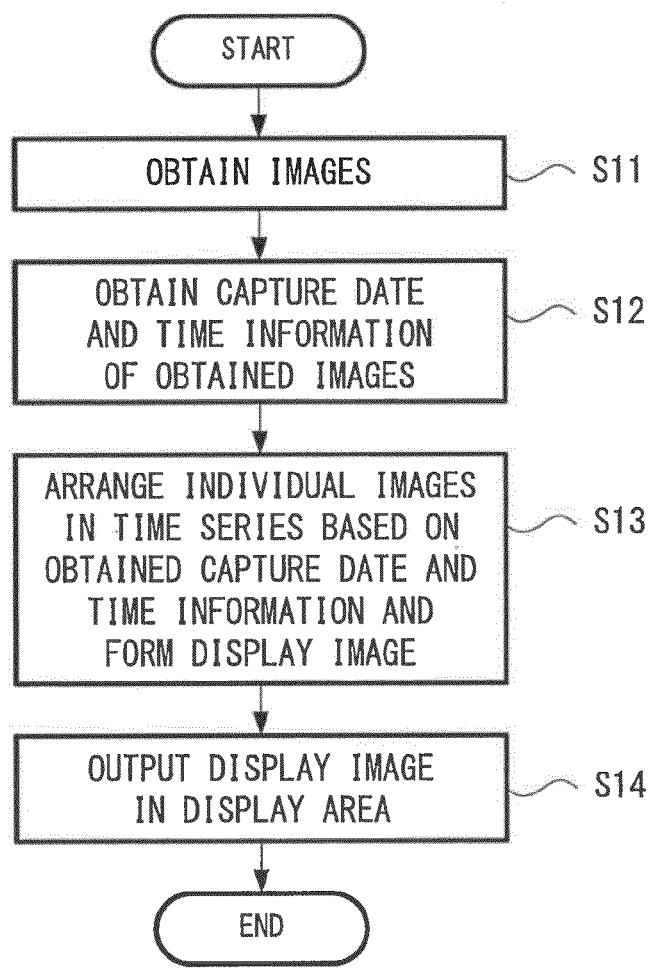
FIG. 4 is a flowchart showing an example of a process of arranging images in the order of capture dates and times according to the first embodiment of the present invention.

FIG. 4 is a flowchart showing an example of a process of arranging images Im in the order of capture dates and times and displaying them on the display section 17. In FIG. 4, the image information obtaining section 13 obtains a plurality of images Im from the image input section 11 or the image storage section 12 (at step S11). The image information obtaining section 13 obtains information of capture date/time recorded along with an image when it was captured for each obtained image Im (at step S12).

Thereafter, the image forming section 14 arranges each image in time series based on the obtained capture date/time information and forms a display image (at step S13) and outputs the formed display image to the display section 17 (at step S14).

Figure 5:
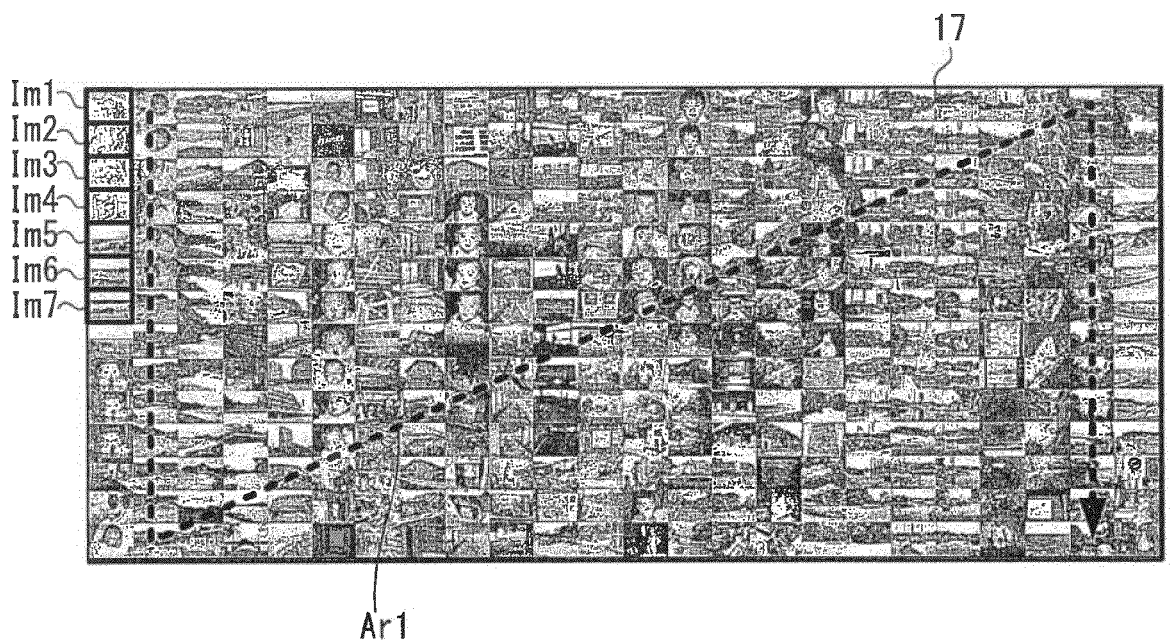
FIG. 5 is a schematic diagram showing an example of a display of images arranged in the order of capture dates and times according to the first embodiment of the present invention.

FIG. 5 shows an example of the case that a display image generated in the process shown in FIG. 4 is displayed on the display section 17. Image Im1 of a dog is displayed at the upper left end of the screen shown in FIG. 5 and images Im2 and Im3 of dogs are displayed below image Im1. Images Im4 to Im7 of scenes are displayed below image Im3.

These images Im are arranged in such a manner that older images are arranged at more left and upper positions (denoted by arrow Ar1 in FIG. 5), namely the oldest image is displayed at the upper left end and the newest image is displayed at the lower right end of the screen.

In this display, the user can enjoy each image Im displayed on a large screen along a time base of capture times.

The arrangement order of images based on capture dates and times is not limited to the example shown in FIG. 5. For example, images may be arranged in another manner that time passes from the lower left end to the upper right end of the screen.

Figure 6:
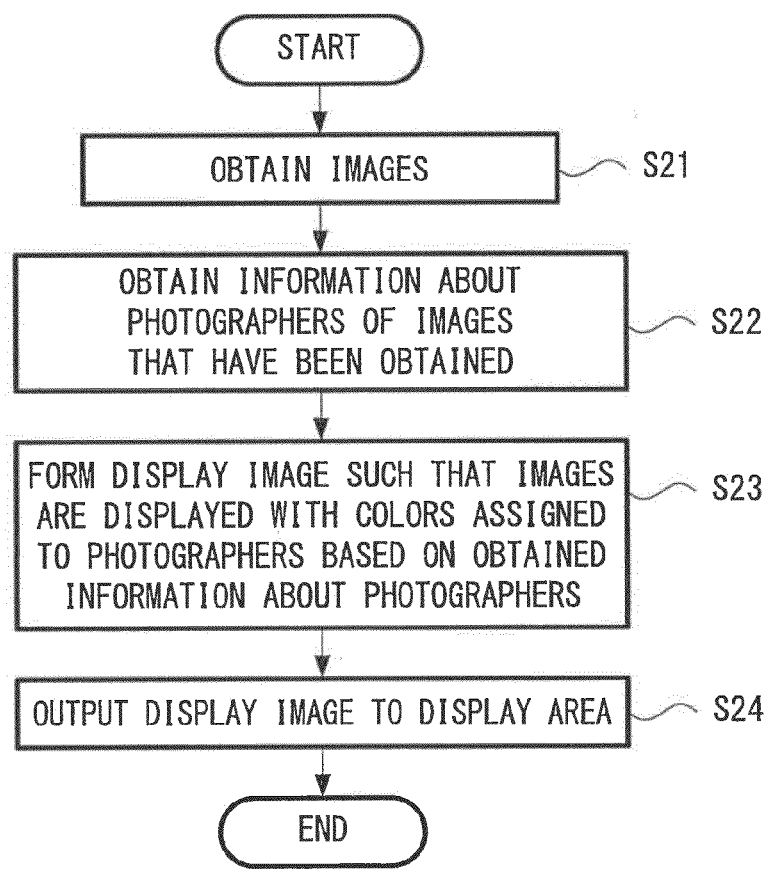
FIG. 6 is a flowchart showing an example of a process of arranging images with colors assigned to photographers according to the first embodiment of the present invention.

In the foregoing examples, one photographer captured a plurality of images Im displayed on the display section 17. Instead, a plurality of images Im captured by a plurality of photographers may be displayed on one screen. In this case, individual images Im are displayed with colors assigned to individual photographers. FIG. 6 is a flowchart showing an example of this process. In FIG. 6, the image information obtaining section 13 obtains a plurality of images Im to be displayed on the display section 17 (at step S21) and obtains information about photographers recorded along with images that were captured for each obtained image Im (at step S22). If meta data recorded along with images are, for example, in the exif format, owner information is obtained as information about photographers.

Thereafter, the image forming section 14 forms a display image based on the obtained information about photographers such that individual images Im are displayed with colors assigned to photographers (at step S23) and outputs the formed display image to the display section 17 (at step S24).

Figure 7:
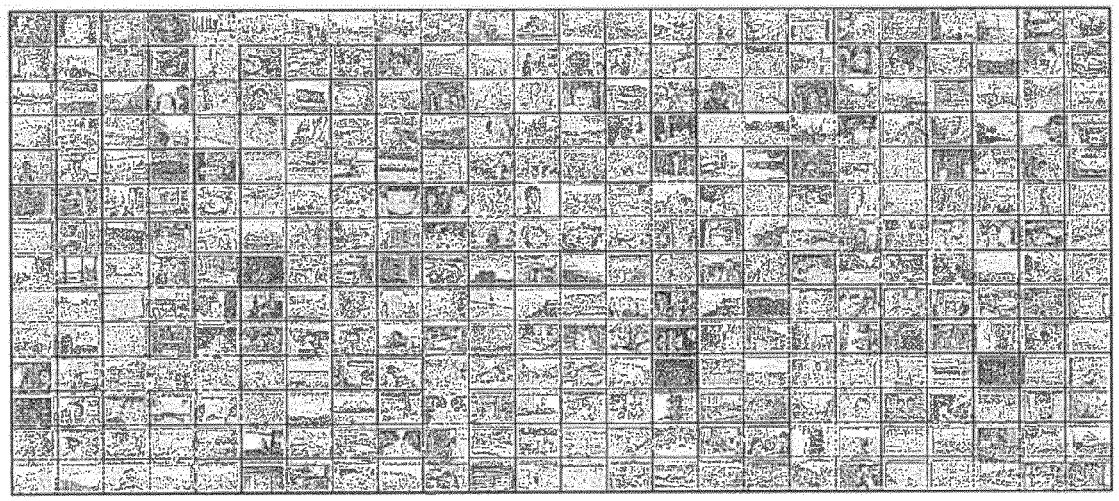
FIG. 7 is a schematic diagram showing an example of a display of images arranged with colors assigned to individual photographers according to the first embodiment of the present invention.

FIG. 7 shows an example of the case that a display image generated in the process shown in FIG. 6 is displayed on the display section 17. FIG. 7 shows an example in which images are displayed with frame colors assigned to individual photographers. In FIG. 7, colors are represented by line types. In other words, images Im captured by photographer A are represented with a solid line frame. Images Im captured by photographer B are represented with a broken line frame. In this example, since a plurality of images Im captured by six photographers, photographer A to photographer F, are displayed, there are six line types of frames that are assigned to individual photographers.

Figure 8:
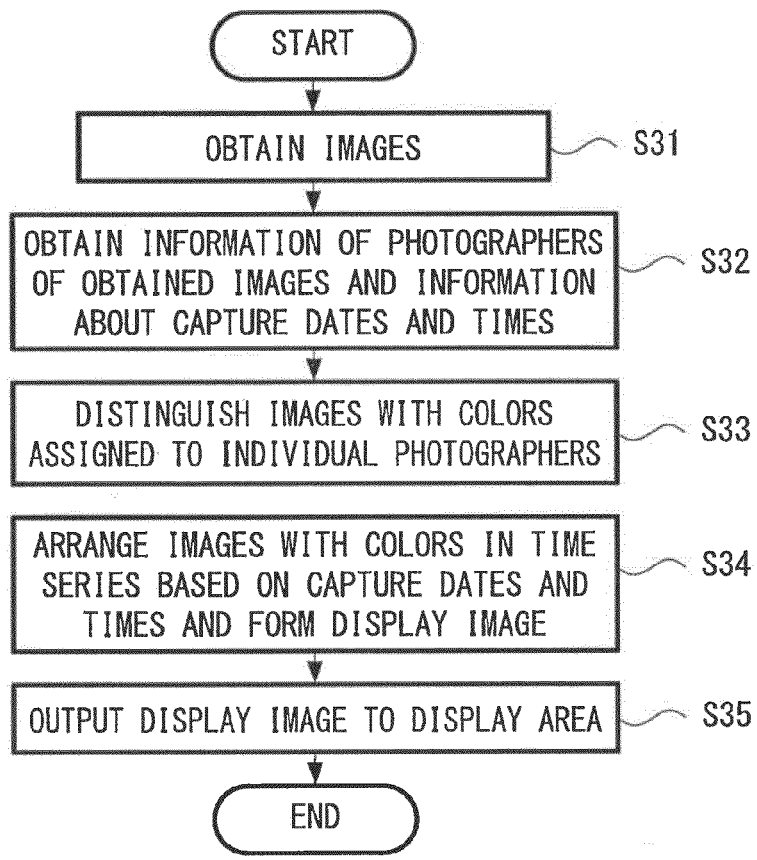
FIG. 8 is a flowchart showing an example of a process of distinguishing images with colors assigned to individual photographers and arranging the images in the order of capture dates and times according to the first embodiment of the present invention.

Images Im with frame colors assigned to individual photographers may be arranged in the order of capture dates and times on the display section 17. FIG. 8 is a flowchart showing an example of this process. In FIG. 8, the image information obtaining section 13 obtains a plurality of images Im displayed on the display section 17 (at step S31) and then obtains information about photographers and information about capturing dates and times recorded along with the individually captured images for each obtained image Im (at step S32).

Thereafter, the image forming section 14 forms a display image such that individual images are displayed with colors assigned to individual photographers based on the information about photographers (at step S33), arranges the individual images Im with colors assigned to the individual photographers in the order of capture dates and times, and forms a display image (at step S34). Thereafter, the image forming section 14 outputs the formed display image to the display section 17 (at step S35). In this example, after images are distinguished with colors assigned to individual photographers, the images are rearranged in the order of capture dates and times. Instead, these processes may be reversely performed.

Figure 9:
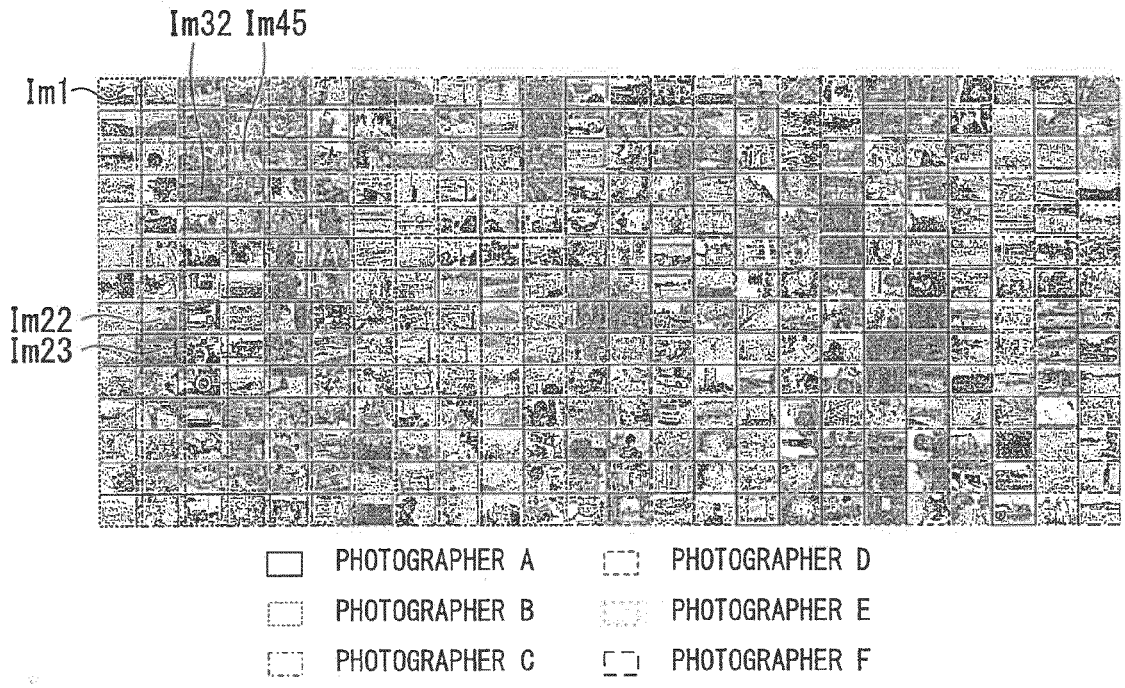
FIG. 9 is a schematic diagram showing an example of a display of images distinguished with colors assigned to individual photographers and arranged in the order of capture dates and times according to the first embodiment of the present invention.

FIG. 9 shows an example of the case that a display image generated in the process shown in FIG. 8 is displayed on the display section 17. Like FIG. 7, FIG. 9 shows the case that a plurality of images Im captured by six photographers, photographer A to photographer F, that are distinguished with line types that are the same as those shown in FIG. 7 are displayed on the screen and the images Im are arranged in such a manner that older images are arranged at more left and upper positions, namely the oldest image is displayed at the upper left end and the newest image is displayed at the lower right end of the screen.

For example, image Im1 at the upper left end of the screen to image Im2 nearly at the center of the right of image Im1 are those captured by photographer B and they have a broken line frame. Image Im23 arranged below image Im22 to image Im32 are those captured by photographer C and they have a dotted line frame. Image Im33 below image Im32 to image Im45 are those captured by photographer B and they have a dashed line frame. In other words, a plurality of images Im captured by a plurality of photographers are successively arranged on one time base of capture dates and times.

Since individual images Im are displayed in such a manner that their photographers are distinguished, they can gather, watch the images together, share their experiences therewith, and exchange their information therebetween. When an image display is performed in this manner, a new communication field can be provided to the users.

In addition, as shown in FIG. 9, when a plurality of images are successively arranged based on each capture date/time, the users can obtain information about objects that the other photographers captured and information about their capture dates and times.

In the foregoing examples, coordinates of a display image displayed on the display section 17 are one-dimensionally set up. Instead, parameters of coordinates may be two-dimensionally set up in such a manner that "time" and "date (month, day, year)" of capture dates and times are set up on the vertical axis and the horizontal axis, respectively. In this case, if images are arranged at accurate positions of the coordinate axes, although a plurality of images may overlap, they are permitted to be displayed on the display section 17.

Figure 10:
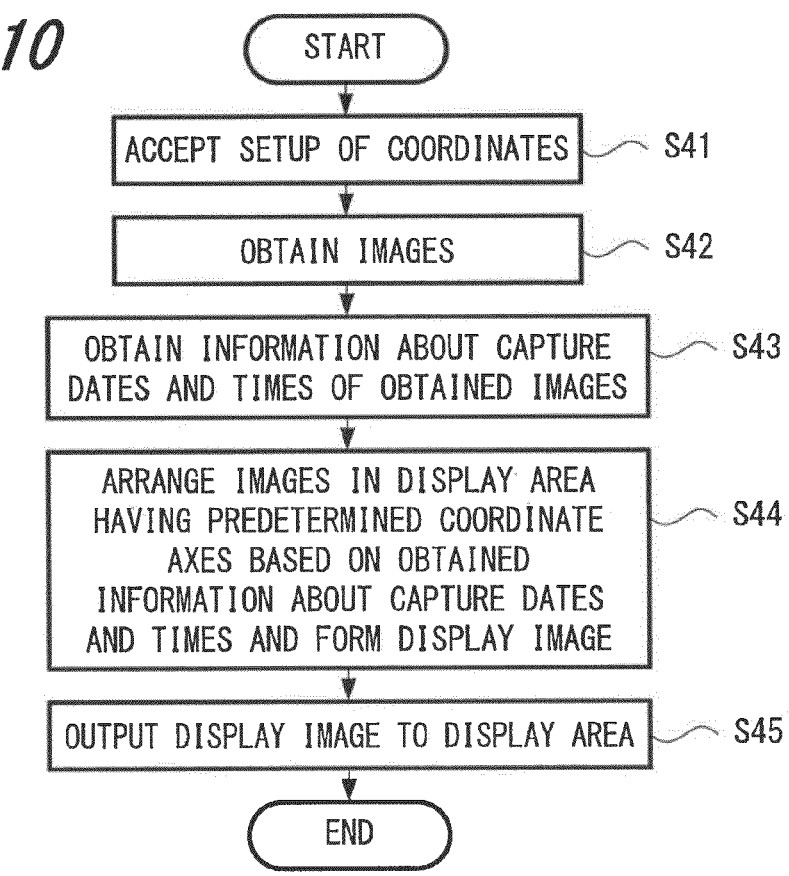
FIG. 10 is a flowchart showing an example of a process of arranging images in a display area composed of two-dimensional coordinates according to another example of the first embodiment of the present invention.

FIG. 10 is a flowchart showing an example of a process of displaying a plurality of images in a display area in which "times" and "dates (month, day, year)" of capture dates and times have been set up in the vertical and horizontal directions of the coordinates, respectively. In FIG. 10, the user is accepted to set up coordinates that compose the display area through the operation input section 19 or the like (at step S41). Thereafter, the image information obtaining section 13 obtains individual images Im to be displayed on the display section 17 (at step S42) and then obtains information about capture dates and times recorded along with the images when they were captured for each obtained image Im (at step S43).

Thereafter, the image forming section 14 arranges individual images Im in the display area having predetermined coordinate axes based on the obtained information about capture dates and times and forms a display image (at step S44). Since capture dates (month, day, year) and capture times have been set up in the vertical direction and the horizontal direction of the coordinates, respectively, the image forming section 14 arranges the individual images Im in the two-dimensional space composed of these coordinates. The formed display image is output to the display section 17 (at step S45).

Figure 11:
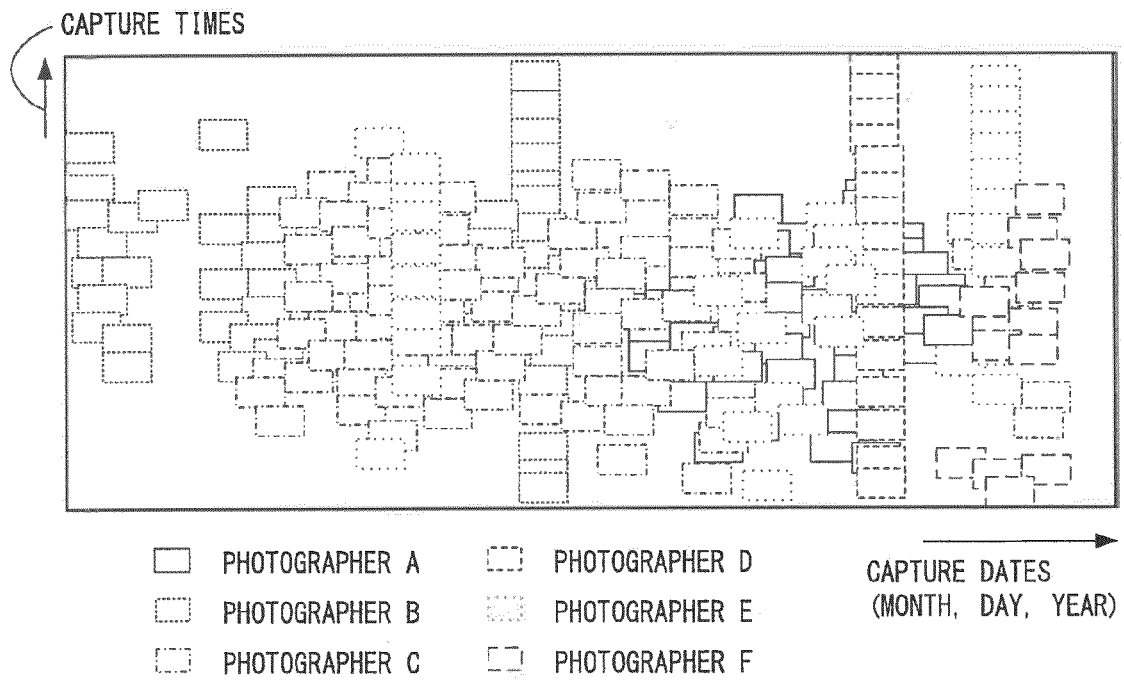
FIG. 11 is a schematic diagram showing an example of a display of images arranged a display area composed of two-dimensional coordinates according to another example of the first embodiment of the present invention.

FIG. 11 shows an example of a display image generated in the process shown in FIG. 10 and displayed on the display section 17. In FIG. 11, for simplicity, images are omitted; only their frames are displayed. Like FIG. 7, FIG. 11 shows a plurality of images Im captured by six photographers, photographer A to photographer F, are displayed and the same line types that distinguish the photographers as those shown in FIG. 7 are used.

Thus, since individual images Im are arranged in a space composed of two-dimensional coordinate axes, a display image displayed on the display section 17 can be read as a graph. In other words, when the user watches a display image displayed on the display section 17, he or she can obtain information about "when", "who", and "is doing what". For example, the user can obtain information about other photographers who were capturing objects while he or she was capturing a particular scene at a particular place.

In other words, since arrangement positions of a plurality of images Im are given meanings, the user who looks over the screen is provided with information about relationship of individual images Im or photographers. In addition, the user who watches individual images Im at a close position, he or she can be provided with detail information of individual images Im.

In the example shown in FIG. 11, capture times and dates (month, day, year) are arranged in the vertical direction and horizontal direction of the coordinates, respectively. However, parameters that are set up for coordinates are not limited to such an example. If images are associated with obtained position information, for example, by GPS or the like, longitude and latitude may be set up in the vertical and horizontal directions, respectively. When individual images Im are arranged in such coordinate axes, the user can read information about positions of photographers who captured them from the screen. In addition, the origin of the coordinate axes is not limited to the left end of the display area. Instead, the origin may be set up, for example, at the center of the screen.

In FIG. 11, images Im captured by all photographers, photographer A to photographer F, are arranged in the display area. Instead, only images Im captured by a particular photographer may be displayed in the display area. FIG. 12A to FIG. 12F show display examples in which images Im displayed on the display section 17 are gradually increased corresponding to the number of photographers.

Figure 12D:
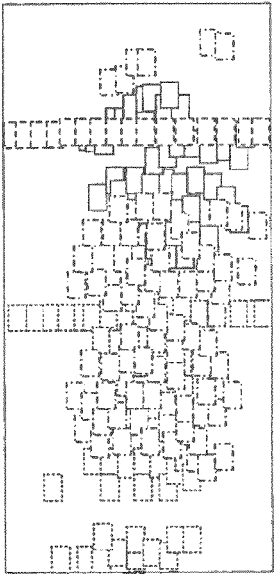
FIG. 12A to FIG. 12F are schematic diagrams showing an example of displays in which images are arranged in a display area composed of two-dimensional coordinates according to another example of the first embodiment of the present invention.
Figure 12E:
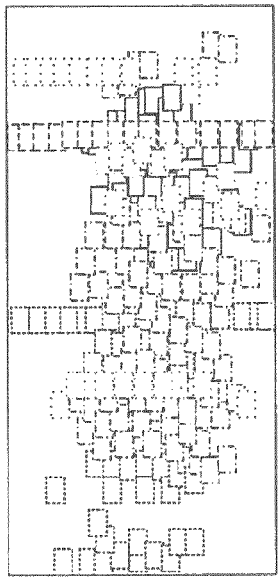
Figure 12F:
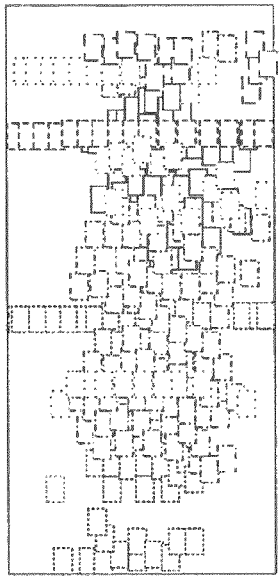
Figure 12A:
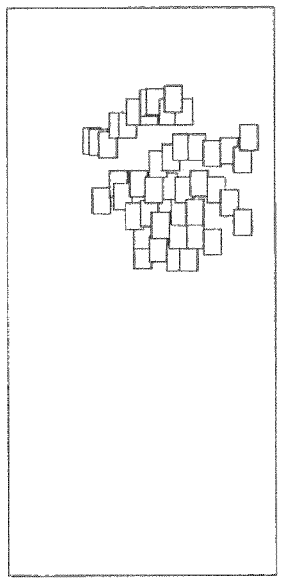
Figure 12B:
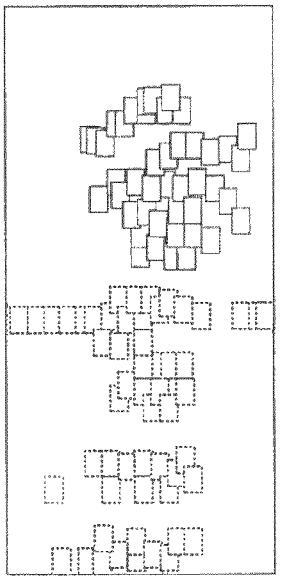
Figure 12C:
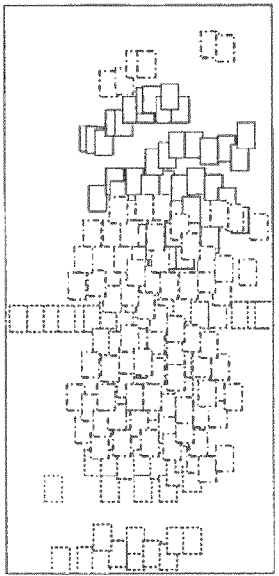

FIG. 12A shows an example of a display in which only images Im captured by photographer A are displayed. FIG. 12B shows an example of a display in which images Im captured by photographer B are displayed along with those captured by photographer A. Likewise, FIG. 12C shows an example of a display in which images Im captured by photographer C are displayed along with those shown in FIG. 12B. FIG. 12D shows an example of a display in which images Im captured by photographer D are displayed along with those shown in FIG. 12C. FIG. 12E shows an example of a display in which images Im captured by photographer E are displayed along with those shown in FIG. 12D. FIG. 12F shows an example of a display in which images Im captured by photographer F are displayed along with those shown in FIG. 12E.

With these displays, the user who watches the screen can easily know capturing features of individual photographers and compare them. FIG. 12A to FIG. 12F exemplify displays in which images captured by individual photographers are gradually increased. Instead, the user may be permitted to freely designate photographers and only images Im captured by the designated photographers may be displayed.

In the foregoing examples, images are arranged on the display section 17 based on information described in the exif format and positioning information of GPS recorded along with images when they were captured and displayed on the display section 17. Instead, images Im may be arranged in the order of higher degrees of correlation with a particular image selected by the user (hereinafter, this image is referred to as a selected image).

Degrees of correlation between images are calculated in such a manner that pixel values as a feature amount of each image Im are detected and the detected pixel values and those of the selected image are compared.

Next, with reference to a flowchart shown in FIG. 13, an example of this process of the image display apparatus 1 will be described. The user is accepted to select any image through the operation input section 19 (see FIG. 1) (at step S51). Thereafter, the image forming section 14 calculates degrees of correlation of all images to be displayed on the display section 17 (display area) with the image selected at step S51 (at step S52).

In addition, the image forming section 14 arranges the individual images Im in the order of higher degrees of correlation with the selected image and forms a display image (at step S53) and outputs the formed display image to the display section 17 (at step S54).

Figure 14A:
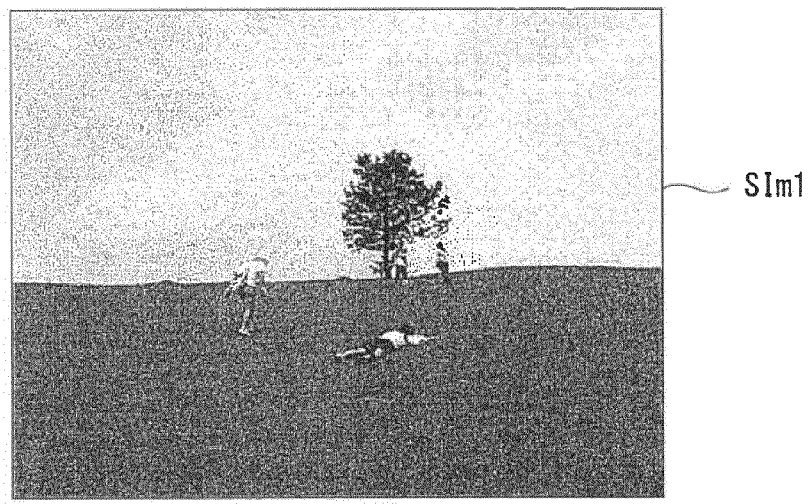
FIG. 14A and FIG. 14B are schematic diagrams showing examples of displays of images arranged in the order of higher degrees of correlation with a user's selected image according to another example of the first embodiment of the present invention.
Figure 14B:
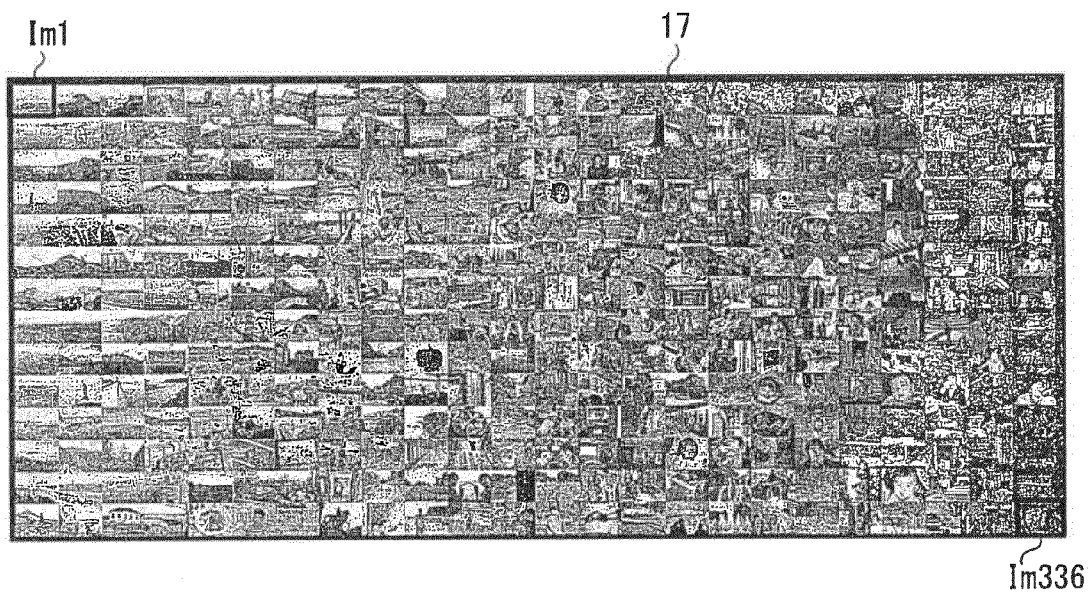

FIG. 14A and FIG. 14B exemplify displays in which such a process is performed. FIG. 14B shows an example of image SIm1 selected by the user. In FIG. 14A and FIG. 14B, degrees of correlation of images are measured based on pixel values. Image Im whose pixel value is closet to that of the selected pixel SIm1 is arranged at the upper left end of the screen. Images Im are arranged in such a manner that images less associated with the selected image SIm1 are arranged at more left and upper positions of the screen, namely image Im336 arranged at the lower right end of the screen has the largest pixel value difference from the selected image SIm in all the images.

When images Im are displayed in such a manner, the user can watch them on the display section 17 from a view point of degrees of correlation of images.

If images Im captured by a plurality of users are displayed in the display area, degrees of correlation of images Im captured by the other users are calculated along with those captured by a particular user. Thus, the particular user can watch images Im that have been captured by the other users and that have high degrees of correlation with image SIm selected by the particular user.

Figure 13:
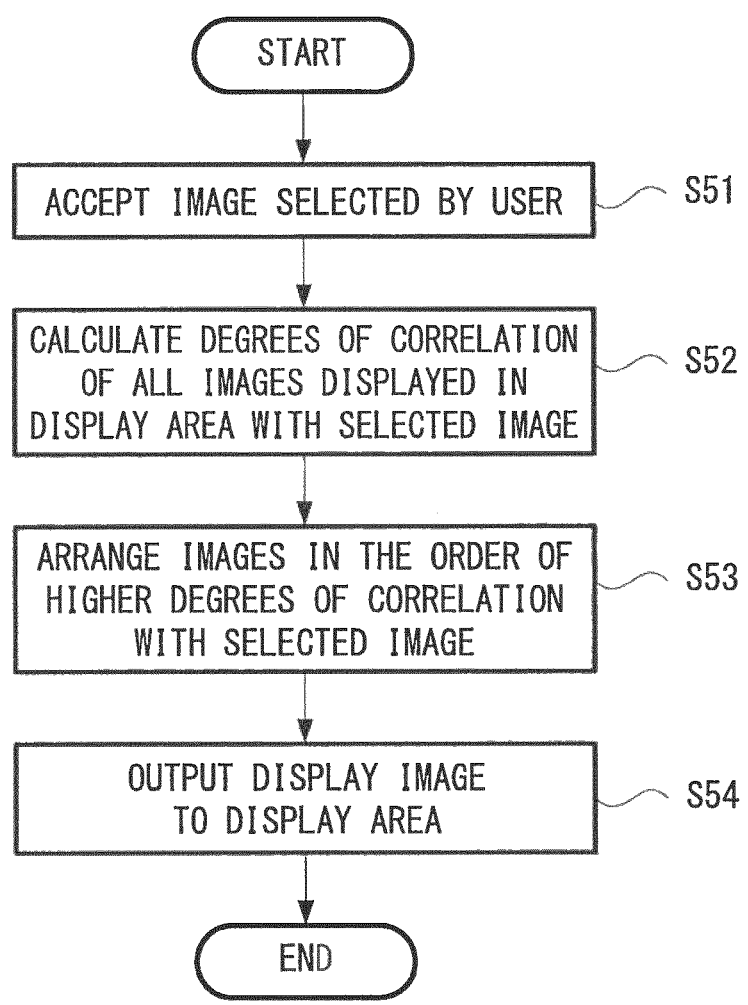
FIG. 13 is a flowchart showing an example of a process of arranging images in the order of higher degrees of correlation with an image selected by the user according to another example of the first embodiment of the present invention.

In the examples shown in FIG. 13, FIG. 14A, and FIG. 14B, the user is allowed to select any image through the operation input section 19. Instead, with a line-of-sight detection apparatus or the like, the position of the user's line-of-sight may be detected and an image displayed at the position of the user's line-of-sight may be treated as a user's selected image and unlike the case shown in FIG. 14A and FIG. 14B, images may not be arranged in the order of higher degrees of correlation with selected image SIm. Instead, only images Im having higher degrees of correlation with selected image SIm may be extracted and highlighted on the display screen.

Figure 15:
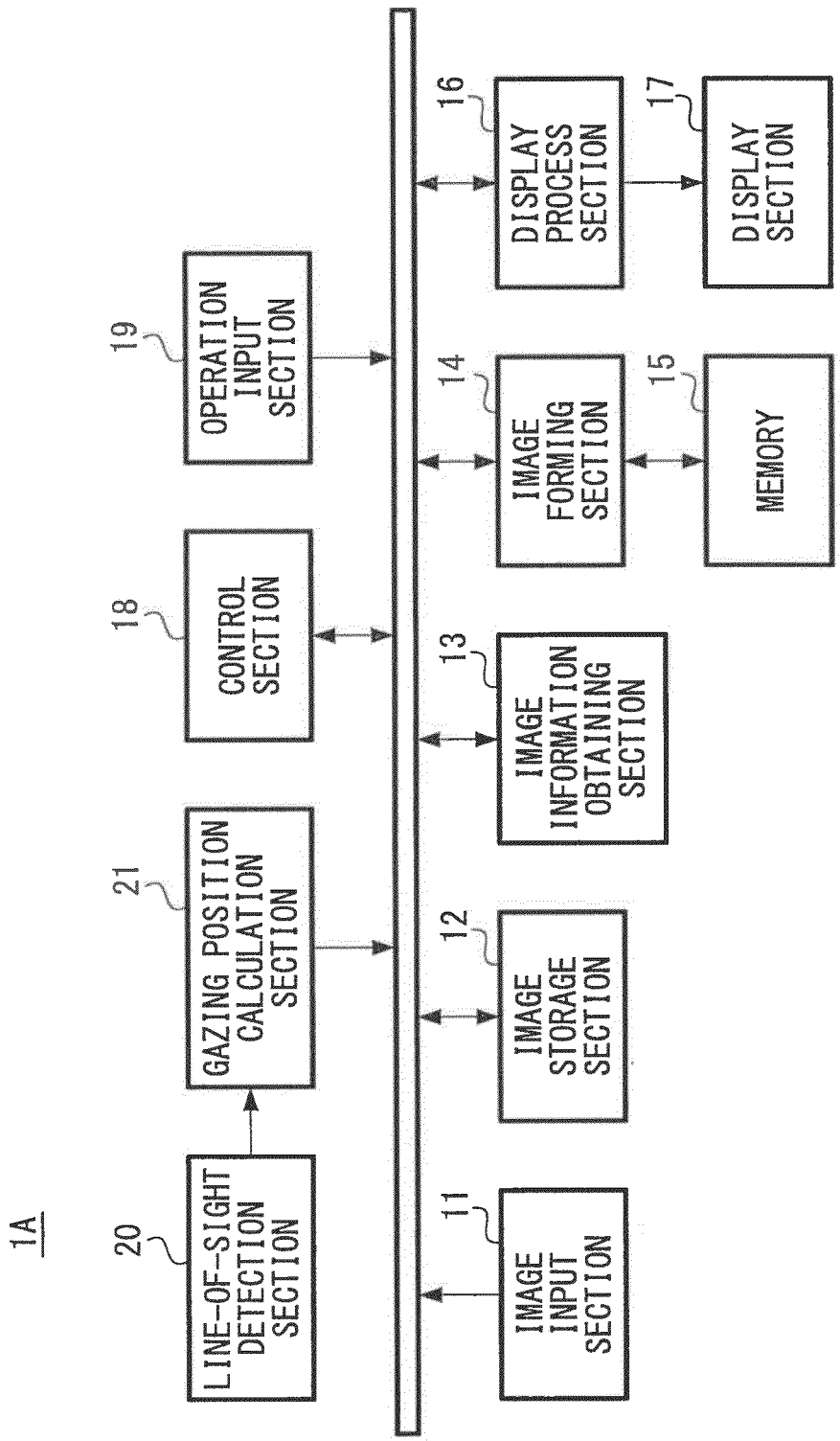
FIG. 15 is a block diagram showing an example of an internal structure of an image display apparatus according to another example of the first embodiment of the present invention.

FIG. 15 shows an example of an internal structure of an image display apparatus 1A that displays images in such a manner. In the image display apparatus 1A shown in FIG. 15, sections corresponding to those of FIG. 1 are denoted by similar reference numerals. The image display apparatus 1A also has a line-of-sight detection section 20 and a gazing position calculation section 21 in addition to the structure of the image display apparatus 1 shown in FIG. 1. The line-of-sight detection section 20 and the gazing position calculation section 21 serve as a detection section of claims of the present invention.

The line-of-sight detection section 20 detects the position of user's line-of-sight and outputs the detected information of the line-of-sight position to the gazing position calculation section 21. The gazing position calculation section 21 correlates the user's line-of-sight position of the line-of-sight position information that is output from the line-of-sight detection section 20 with the display position of image Im and designates image Im arranged at the user's line-of-sight position as image SIm selected by the user.

Figure 16:
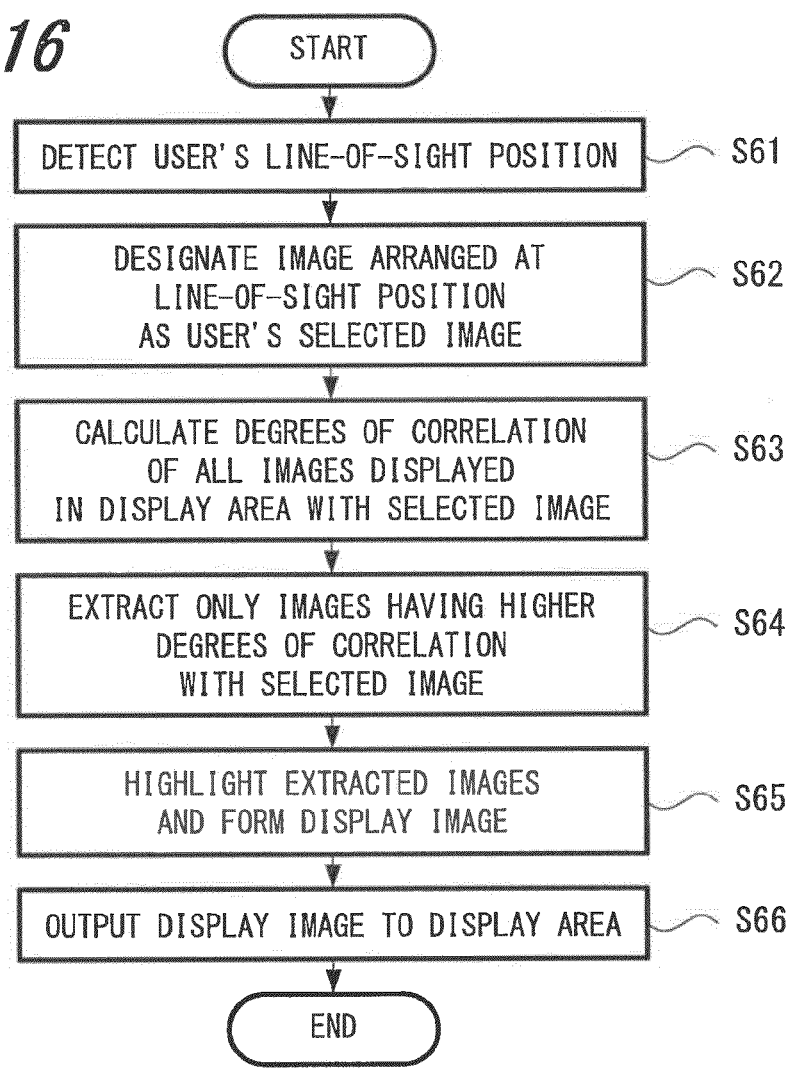
FIG. 16 is a flowchart showing an example of a process of highlighting images having high degrees of correlation with an image selected by the user according to another example of the first embodiment of the present invention.

FIG. 16 is a flowchart showing an example of the process of the image display apparatus 1A shown in FIG. 15. In FIG. 16, when the line-of-sight detection section 20 detects the user's line-of-sight position (at step S61), the gazing position calculation section 21 performs a process of designating image Im arranged at the detected line-of-sight position as selected image SIm (at step S62).

Thereafter, the image forming section 14 calculates degrees of correlation of all images to be displayed on the display section 17 with selected image SIm (at step S63) and extracts only images Im with higher degrees of correlation with selected image SIm (at step S64). Thereafter, the image forming section 14 highlights the extracted images Im, forms a display image (at step S65), and outputs the formed display image to the display section 17 (at step S66).

Figure 17A:
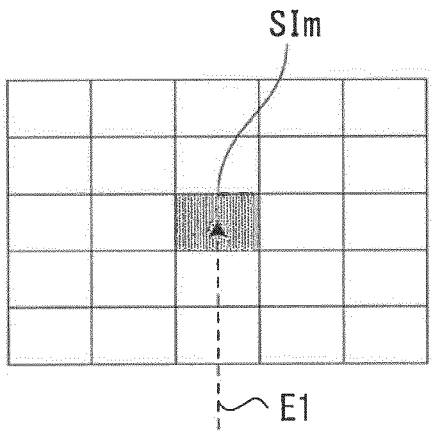
FIG. 17A and FIG. 17B are schematic diagrams showing examples of displays in which images having higher degrees of correlation with an image selected by the user according to another example of the first embodiment of the present invention.
Figure 17B:
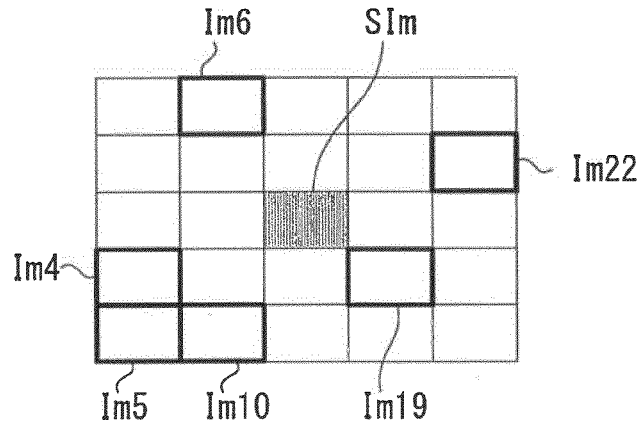

FIG. 17A and FIG. 17B exemplify displays in which the process shown in FIG. 16 is performed. In FIG. 17A and FIG. 17B, for easy understanding, only an area near the user's line-of-sight position is illustrated. In FIG. 17A, since user's line-of-sight E1 is at a center portion of the display area, image Im arranged at this position is designated as selected image SIm. FIG. 17B shows an example in which only images having higher degrees of correlation with selected image SIm are highlighted.

In FIG. 17B, since images having higher degrees of correlation with selected image SIm are image Im4, image Im5, image Im6, image Im10, image Im19, and image Im22, these outer frames are highlighted with a solid line.

If images displayed in such a manner, those having higher degrees of correlation with the user's selected image can be presented to him or her without necessity of rearranging individual images Im in the order of higher degrees of correlation.

As shown in FIG. 11, if images are permitted to overlap and images having higher degrees of correlation with selected image SIm are arranged behind other images, in addition to the process of highlighting outer frames of images, a process of displaying images on the foreground plane is performed.

Figure 18A:
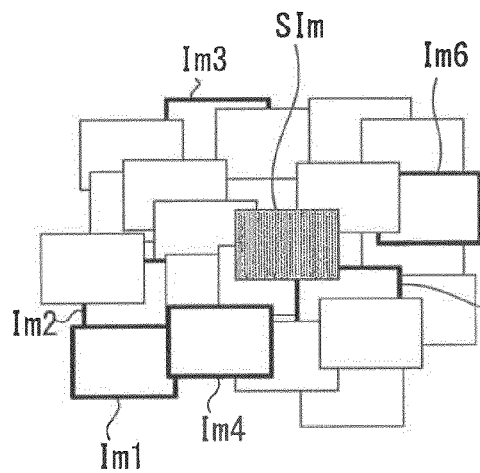
FIG. 18A and FIG. 18B are schematic diagrams showing examples of displays in which images having higher degrees of correlation with an image selected by the user are moved on the foreground plane according to another example of the first embodiment of the present invention.
Figure 18B:
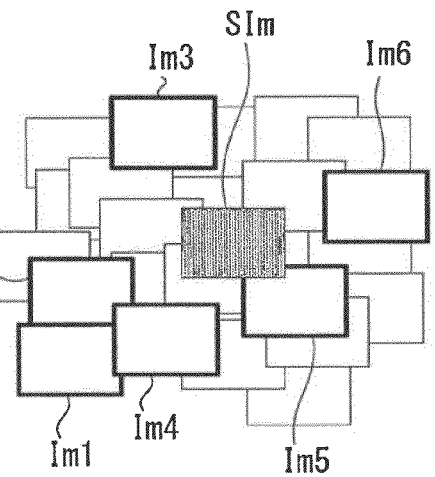

FIG. 18A and FIG. 18B exemplify displays in which such a process is performed. FIG. 18A shows the state in which images Im1 to image Im5 having higher degrees of correlation with selected image SIm are displayed behind other images. FIG. 18B shows an example of the state in which images Im displayed behind other images are moved to the foreground plane.

When images Im having higher degrees of correlation with selected image SIm have been arranged behind other images that do not have higher degrees of correlation with selected image SIm, if images Im having higher degrees of correlation with selected image SIm are moved to the foreground plane, even if images Im are permitted to overlap on the screen, the user can watch both selected image SIm and images Im having higher degrees of correlation therewith. Images Im displayed on the foreground plane are not limited to those having higher degrees of correlation with selected image SIm, but, for example, images Im captured by a photographer designated by the user.

Instead, images Im having higher degrees of correlation with selected image SIm that have been moved to the foreground plane may be moved toward the position of selected image SIm.

Figure 19A:
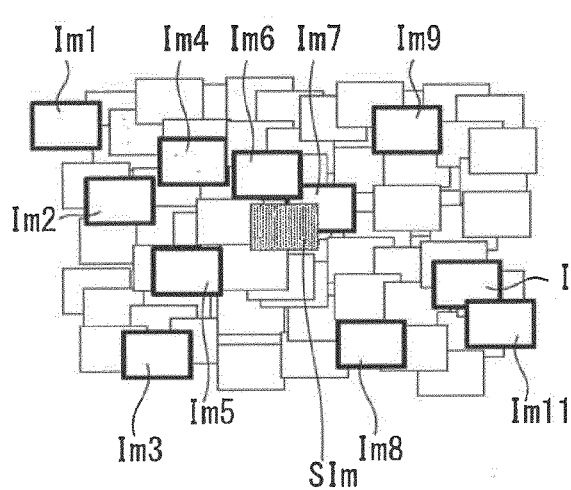
FIG. 19A and FIG. 19B are schematic diagrams showing examples of displays in which images having high degrees of correlation with an image selected by the user are moved to the vicinity of the image selected by the user according to another example of the first embodiment of the present invention.
Figure 19B:
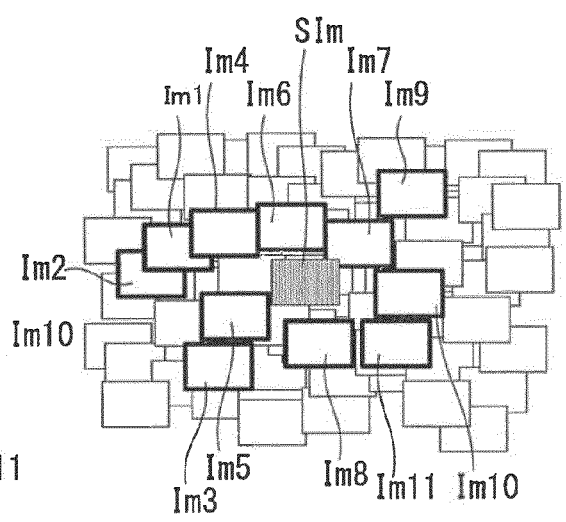

FIG. 19A and FIG. 19B exemplify displays in which such a process is performed. FIG. 19A shows the state in which image Im1 to image Im11 having higher degrees of correlation with selected image SIm are highlighted and moved to the foreground plane. FIG. 19B shows an example of the case in which image Im1 to image Im11 are moved toward the position of selected image SIm. FIG. 19B shows the state in which image Im1 to image Im11 having higher degrees of correlation with selected image SIm have been moved toward the position of selected image SIm. FIG. 19B shows the state in which image Im1 to image Im11 having higher degrees of correlation with selected image SIm are moved in the direction of arrow Ar2 and thereby they have been gathered in the vicinity of selected image SIm.

When images are displayed as shown in FIG. 19A and FIG. 19B, even if many images are displayed on a large screen as shown in FIG. 3 or the like, the user can simultaneously and easily compare and watch selected image SIm and images Im1 to Im11 having higher degrees of correlation therewith.

If a plurality of users simultaneously watch one display image, selected image SIm may be decided based on the line-of-sight position of each user. Images Im having higher degrees of correlation with each decided and selected image SIm are highlighted and moved toward the position thereof.

In the structures and processes shown in FIG. 13 to FIG. 19A and FIG. 19B, pixel values extracted as feature amounts of parameters of calculating degrees of correlation from selected image SIm and individual images Im are used. Instead, degrees of correlation may be calculated with parameters, for example, of color distribution information and frequencies of a histogram. If objects in images are persons, features of faces, such as eyes, nose, and mouth, are detected as feature amounts and those of detected objects may be compared to calculate degrees of correlation.

Instead, while the user is capturing an object or after he or she has captured it, he or she may be prompted to input information, for example, about the object or a scene. Degrees of correlation of images may be calculated based on these information. As information about objects, categories such as "persons, animals, substances, and scenes" may be provided. When the user captures an image, he or she may be prompted to designate one of these categories to which the captured object belongs.

Instead of prompting the user to select any image Im, he or she may be prompted to designate an object. Only images Im containing the designated object may be extracted. The extracted images Im may be processed such that they are highlighted or moved to the line-of-sight position. In this case, images of particular objects may have been stored in a database and an image recognition is performed with the image information to identify the object. If there are a plurality of users, a plurality of databases that store information about objects may be prepared corresponding to the number of users.

Figure 20:
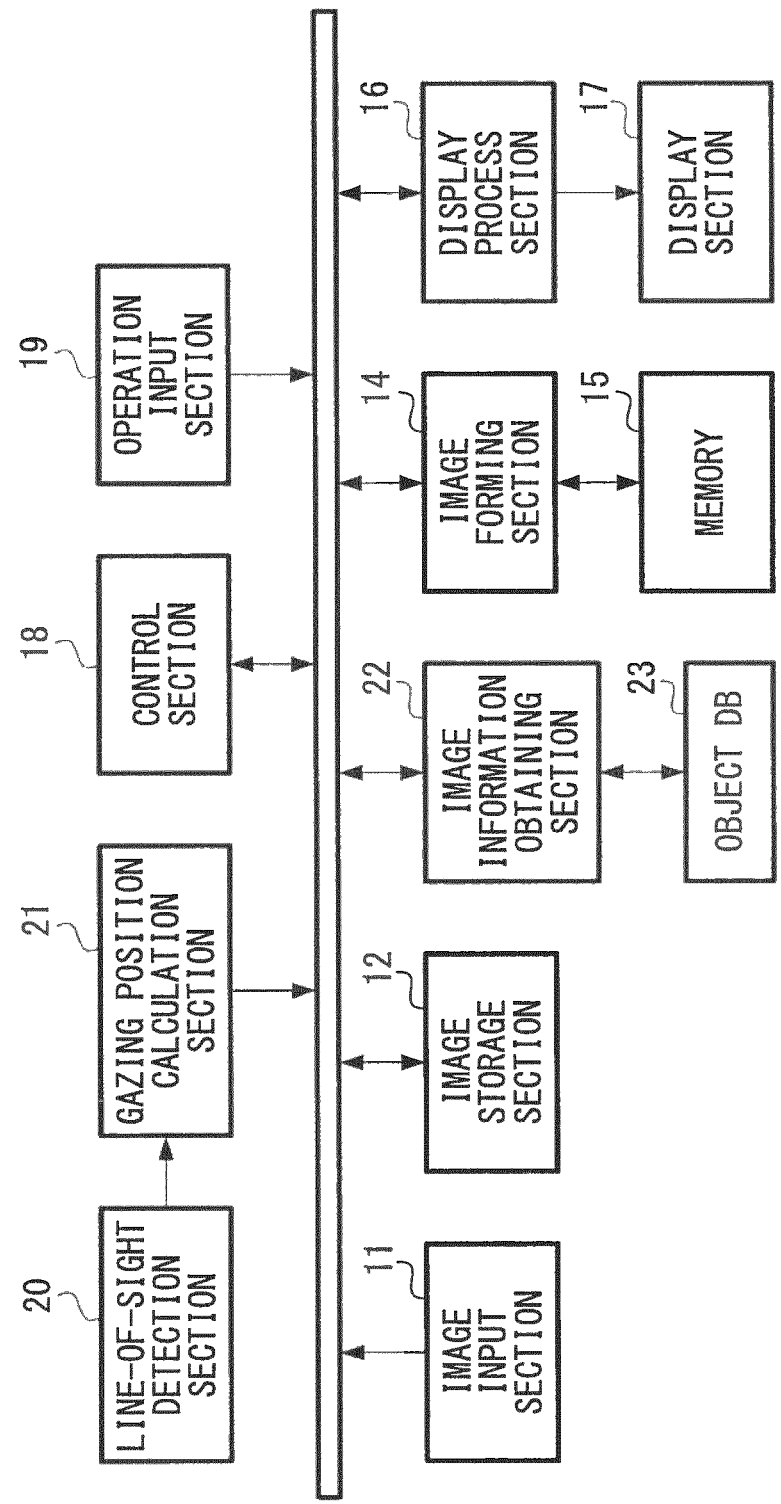
FIG. 20 is a block diagram showing an example of an internal structure of an image display apparatus according to another example of the first embodiment of the present invention.

FIG. 20 shows an example of a structure of an image display apparatus 1B that identifies an object. In FIG. 20, sections corresponding to those in FIG. 1 and FIG. 15 are denoted by similar reference numerals and their detail description will be omitted. The image display apparatus 1B shown in FIG. 20 has an image recognition process section 22 and an object database 23 (hereinafter also referred to as the DB 23) instead of the image information obtaining section 13 of the image display apparatus 1A shown in FIG. 15.

The image recognition process section 22 compares a standard pattern of information of a particular object stored in the object DB 23 with a feature amount extracted from each image Im and identifies a feature amount that matches or nearly matches the standard pattern to perform an image recognition. The image recognition process section 22 determines that image Im that has a feature amount matches or nearly matches the standard pattern be image Im containing an object stored in the object DB 23 and outputs the determined information to the image forming section 14. Image information of objects stored in the object DB 23 may be provided corresponding to a plurality of objects. In this case, the user is prompted to select one of several objects and image information of the selected object is used as the standard pattern.

In each of the foregoing examples, image Im that the user designates through the operation input section 19 or the like and image Im arranged at the line-of-sight position detected by the line-of-sight detection section 20 are decided as image SIm selected by the user, respectively Selected image SIm may be decided by other than the methods of the foregoing examples.

As a method of detecting a user's designation position, the display section 17 may be composed, for example, of a touch panel. The position that the user has touched may be treated as a user's designation position. Instead, a user's designation position may be detected, for example, with a camera. If the display section 17 is composed of a rear-projection type projector screen, a sensor such as a camera may be disposed behind the screen and a position detected by the camera may be decided as a user's designation position.

Figure 21:
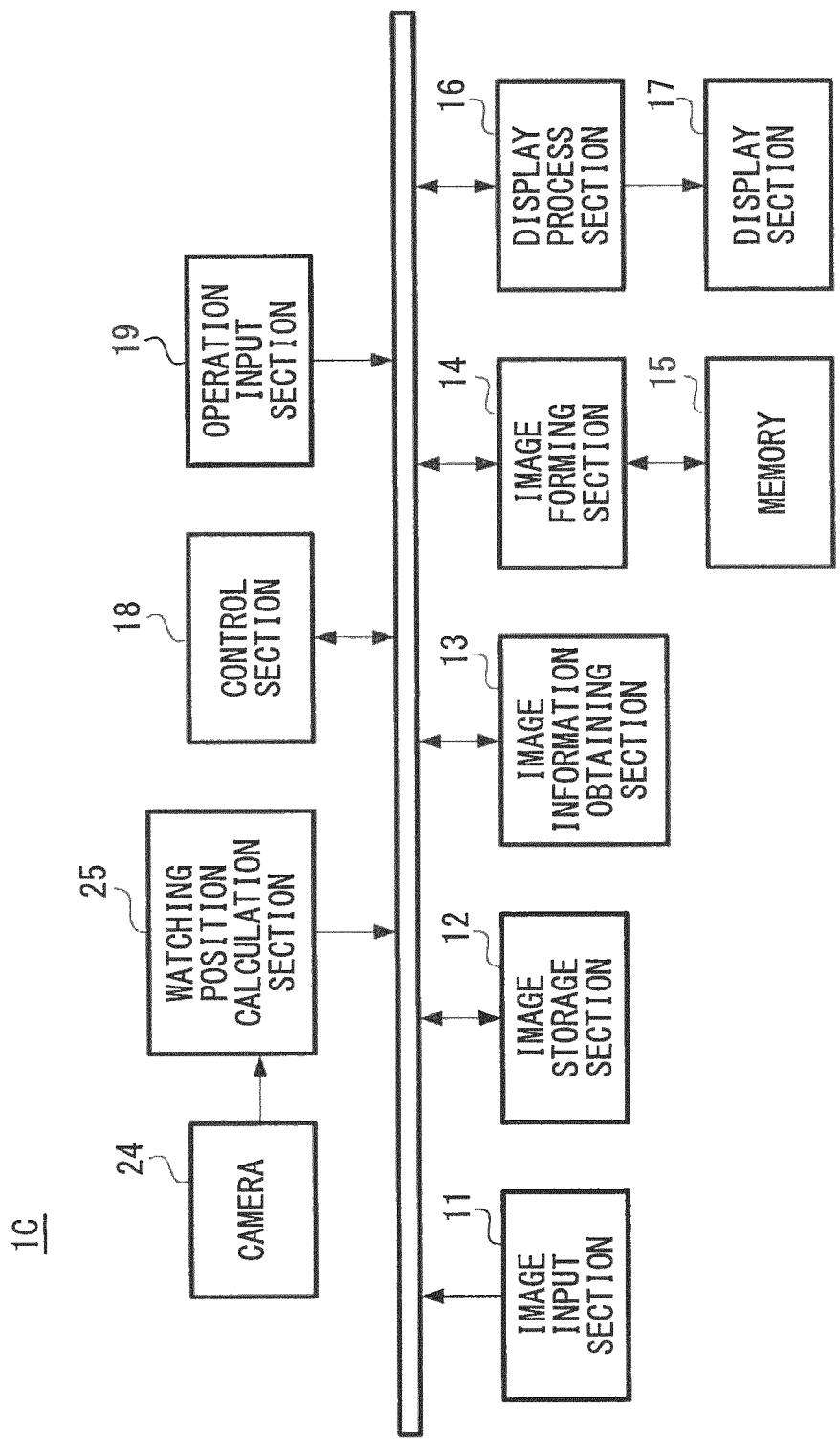
FIG. 21 is a block diagram showing an example of an internal structure of an image display apparatus according to a second embodiment of the present invention.

Next, with reference to FIG. 21 to FIG. 24A and FIG. 24B, a second embodiment of the present invention will be described. In this embodiment, a process of adjusting the size and arrangement position of each image Im displayed on the display section 17 is performed based on a user's watching state. FIG. 21 is a block diagram showing an example of an image display apparatus 1c of this embodiment. In FIG. 21, sections corresponding to those in FIG. 1, FIG. 15, and FIG. 20 are denoted by similar reference numerals and their detail description will be omitted.

An image display apparatus 1C shown in FIG. 21 has a camera 24 and a watching position calculation section 25 along with the structure shown in FIG. 1. The camera 24 captures the vicinity of a user's watching position, detects him or her, and outputs the detected result to the watching position calculation section 25. The watching position calculation section 25 calculates the user's watching position based on the detected result information that is output from the camera 24. In addition, the watching position calculation section 25 calculates the distance between the watching position and the display surface of the display section 17. Thereafter, the watching position calculation section 25 outputs the calculated distance information to an image forming section 14. The camera 24 and the watching position calculation section 25 serve as a detection section of claims of the present invention.

The image forming section 14 performs a process of decreasing the display size of each image Im if the user's watching position is far from the screen and performs a process of increasing the display size of each image Im if the user's watching position is close to the screen. In other words, the image forming section 14 sets up the size of each image Im such that the size of image Im displayed on the display section 17 is reversely proportion to the distance between the user's watching position and the screen.

FIG. 22 is a flowchart showing an example of a process of the image display apparatus 1C. In FIG. 22, the watching position calculation section 25 calculates the distance between the display surface of the image and the user's watching position (at step S71). Thereafter, the watching position calculation section 25 determines whether or not the currently calculated distance has changed from the last calculated distance (at step S72). If the currently calculated distance between the image display surface and the user's watching position has not changed from the last calculated distance, the process is complete.

If the currently calculated distance between the image display surface and the user's watching position has changed from the last calculated distance, the image forming section 14 sets up the image display magnification for a value corresponding to the distance (at step S73), sets up the display size of each image Im for the display magnification that has been set up, forms a display image (at step S74), and outputs the formed display image to the display section 17 (at step S75).

Figure 23A:
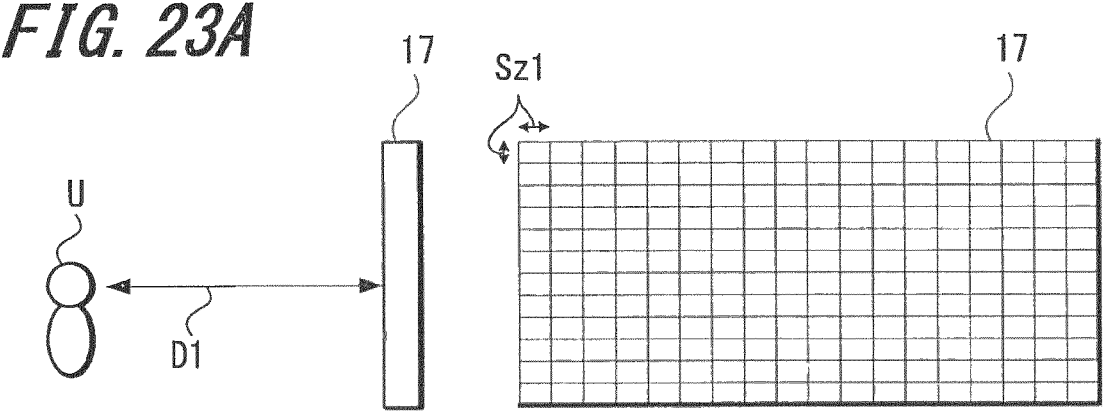
FIG. 23A, FIG. 23B, and FIG. 23C are schematic diagrams showing examples of displays in which the size and arrangement positions of images are changed corresponding to a user's watching position according to the second embodiment of the present invention.
Figure 23B:
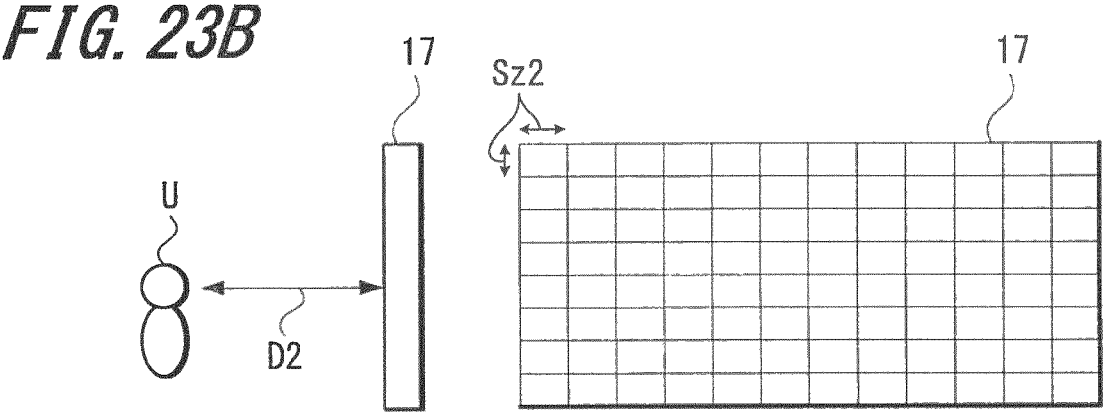
Figure 23C:
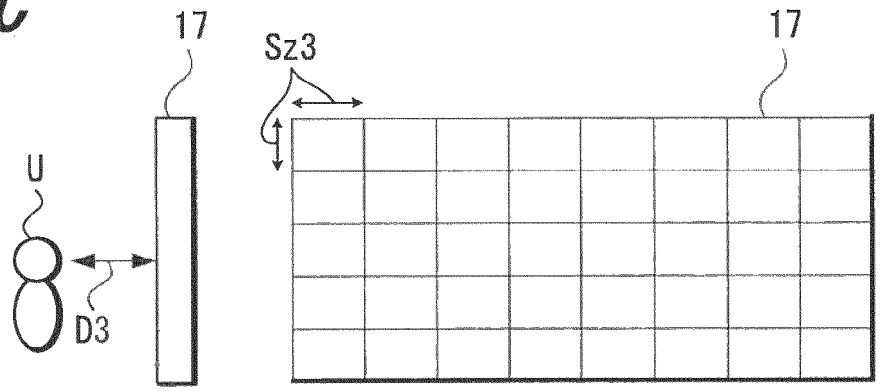

FIG. 23A to FIG. 23C shows examples of displays on the display section 17 when such a process is performed. The left side of each of FIG. 23A to FIG. 23C shows respective side views of the display section 17 and the user U as an example of the distance between the display surface of the display section 17 and the watching position of the user U. When the distance between the display surface of the display section 17 and the watching position of the user U shown in FIG. 23A is denoted by D1, that shown in FIG. 23B is denoted by D2, and that shown in FIG. 23C is denoted by D3, they have the relationship of D1>D2>D3.

The right side of each of FIG. 23A to FIG. 23C shows an example of a display on the display section 17 at the corresponding distance. When the size of image Im shown in FIG. 23A is denoted by Sz1, that shown in FIG. 23B is denoted by Sz2, and that shown in FIG. 23C is denoted by Sz3, they have the relationship of Sz1<Sz2<Sz3.

In other words, as shown in FIG. 23A, if distance D1 between the watching position of user U and the screen is large, size Sz1 of each image Im displayed on the screen becomes small. As shown in FIG. 23C, when distance D3 between the watching position of user U and the screen is small, size Sz3 of each image Im displayed on the screen becomes large.

If the user wants to look over the display screen, since he or she watches each image from a position far from the screen, many images Im having a small display size are displayed on the screen. As a result, user U can simultaneously look over many images Im. If user U wants to check for details of each image Im displayed on the display screen, since he or she tries to watch each image Im at a position close to the display screen, the size of each image Im displayed on the screen becomes large. Thus, user U can more precisely check for details of each image Im.

In this embodiment, the arrangement order of each image Im and parameters that designate the arrangement order are the same as those of the first embodiment. Thus, when user U looks over a display image on the display section 17 at a position far therefrom, he or she can obtain information represented by the arrangement position of each image Im such as degrees of correlation of individual images Im and information about their capture times and locations.

The size of image Im is enlarged or reduced based on the watching position of user U. FIG. 23A to FIG. 23C exemplify that images Im displayed are not permitted to overlap. However, this embodiment can be applied to the case that images displayed are permitted to overlap. In this case, the size of each image Im is not simply enlarged or reduced. The arrangement position of each image Im is moved as it is enlarged or reduced.

Figure 24A:
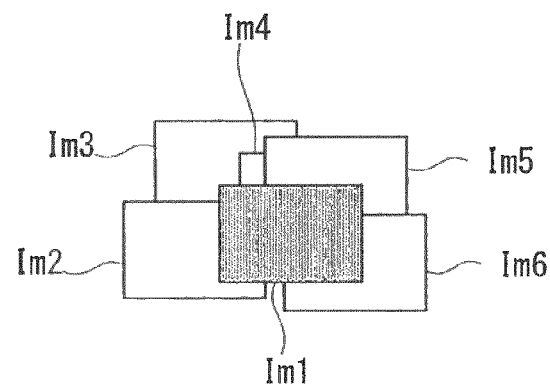
FIG. 24A, FIG. 24B, and FIG. 24C are schematic diagrams showing examples of displays in which the size and arrangement positions of images are changed corresponding to the user's watching position according to the second embodiment of the present invention.
Figure 24B:
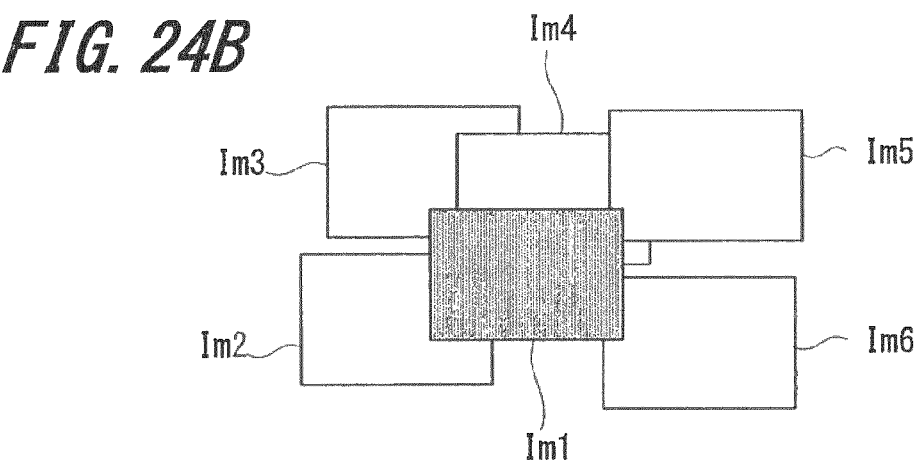
Figure 24C:
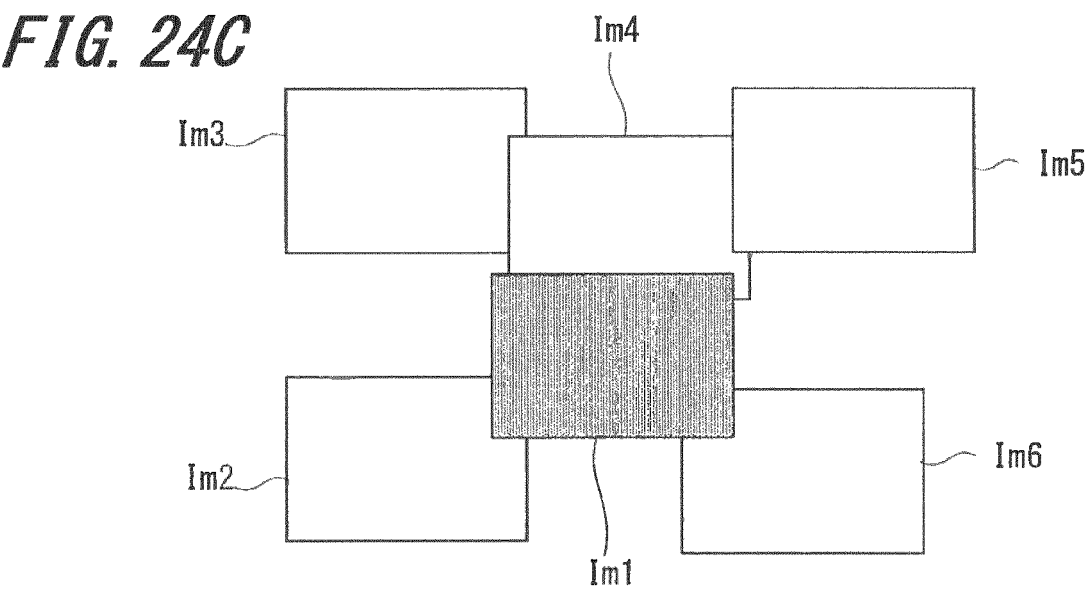

FIG. 24A to FIG. 24C exemplify displays in which each image Im displayed on the display section 17 is gradually enlarged. In each of FIG. 24A to FIG. 24C, user U gazes image Im at the center of the screen.

FIG. 24A shows the state in which in the vicinity of image Im1 that user U is gazing other images Im2 to Im6 that overlap are displayed. FIG. 24B shows the state in which around image Im1 that user U is gazing image Im2 to image Im6 are gradually moving outward. FIG. 24C shows the state in which since image Im2 to image Im6 have moved outward from image Im1 that user U is gazing, the individual images nearly do not overlap.

When such a process is performed, even if images Im displayed are permitted to overlap, information that user U wants to obtain is provided corresponding to the watching position of user U such that he or she can obtain the information.

The foregoing series of processes can be executed by hardware or software. If the series of processes are executed by software, a computer that has dedicated hardware in which programs that compose the software have been built is used or the programs are installed from a record medium, for example, to a general-purpose computer that can execute various types of functions by installing various types of software.

Figure 25:
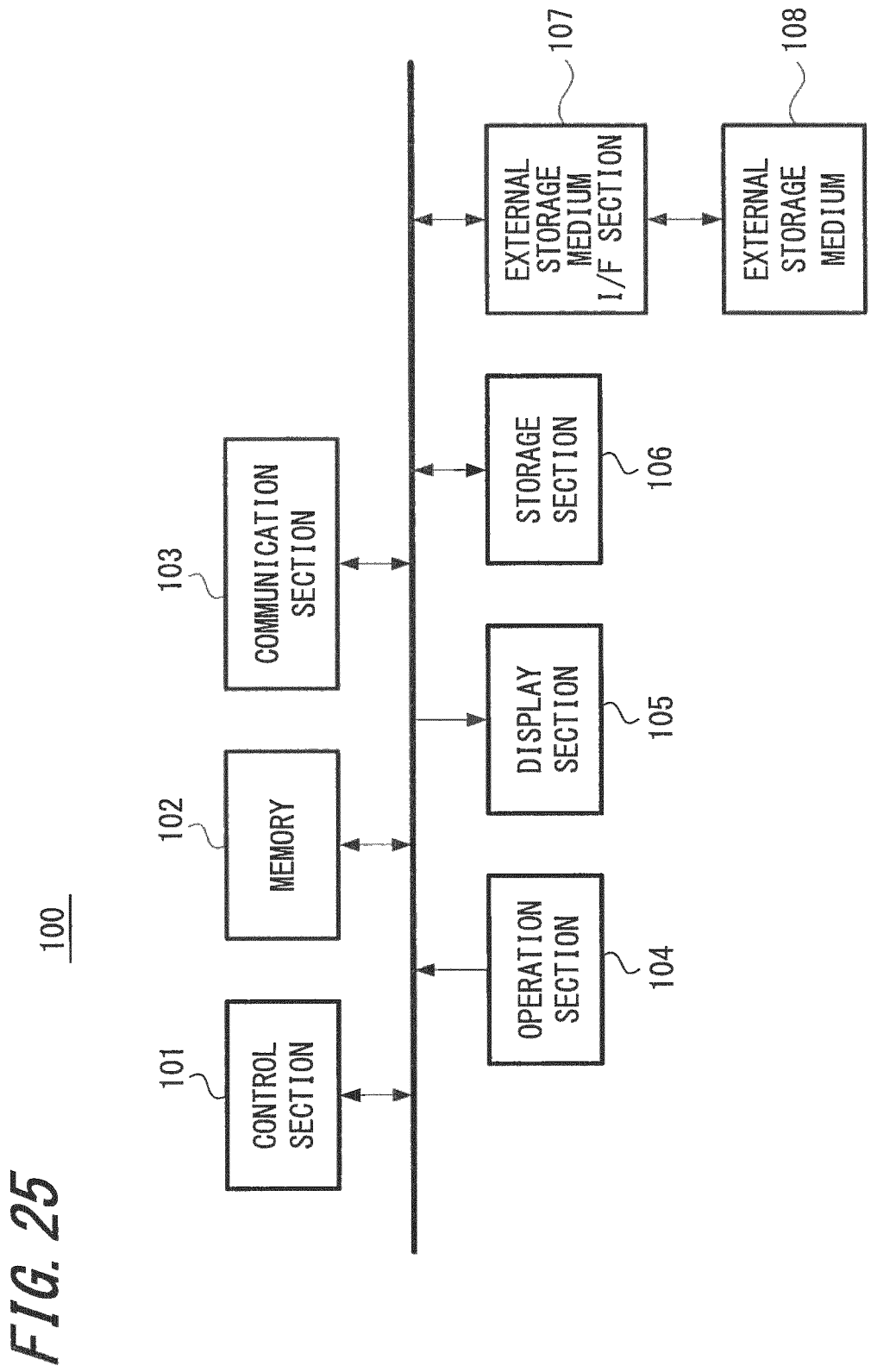
FIG. 25 is a block diagram showing an example of a structure of a personal computer.

FIG. 25 shows an example of a structure of a personal computer 100 (hereinafter also referred to as the PC 100) that can perform the series of processes by executing the programs. The PC 100 shown in FIG. 25 has a control section 101, a memory 102, a communication section 103, an operation section 104, a display section 105, a storage section 106, an external storage medium I/F section 107, and an external storage medium 108.

The control section 101 is composed of a central processing unit (CPU) and so forth. The control section 101 executes the above-described series of processes and other various types of processes according to programs stored in the memory 102 or the storage section 106. The memory 102 is composed of a random access memory (RAM) and a read only memory (ROM). The memory 102 stores programs, which the control section 101 executes, data, and so forth.

The communication section 103 communicates with an external device through a network such as the Internet or a local area network. The external storage medium I/F section 107 drives the external storage medium 108 such as a magnetic disc, an optical disc, a magneto-optical disc, or a semiconductor memory, and obtains programs, data, and so forth therefrom. When necessary, the obtained programs and data are transferred to the external storage medium 108 and recorded thereon.

The operation section 104 is composed of a keyboard, a mouse, and so forth. The operation section 104 generates an operation signal corresponding to a user's operation input and outputs the operation signal to the control section 101. The display section 105 is a display device composed of a cathode ray tube (CRT) or an liquid crystal display (LCD). The storage section 106 is composed, for example, of a hard disk or a digital versatile disc (DVD), and records programs, which the control section 101 executes, and various types of data.

As shown in FIG. 25, the program record medium that stores programs that are installed to a computer and executed thereby is composed of the external storage medium 108. The external storage medium 108 includes the memory 102 that stores programs provided to the user and that has been mounted in the apparatus and the storage section 106 as well as a removable medium such as the foregoing magnetic disk.

When necessary, programs are stored in the program record medium using a wired or wireless communication medium such as a local area network, the Internet, or a digital satellite broadcast through the communication section 103 that is an interface such as a router or a modem.

In this specification, process steps that describe programs stored in the program record medium include those executed chronologically in the description order and those that are not executed chronologically, but executed in parallel or individually (for example, parallel processes or object processes).

In addition, the programs may be processed by a single computer or distributed by a plurality of computers. In addition, the programs may be transferred to a remote computer and executed thereby.

It should be understood by those skilled in the art that various modifications, combinations, sub-combinations and alternations may occur depending on design requirements and other factors insofar as they are within the scope of the appended claims or the equivalents thereof.

What is claimed is:

1. An image display apparatus, comprising:
   a detection section configured to detect a user's watching state;
   an image forming section configured to form a display image that is displayed on a screen based on a plurality of images and changes the display image based on a detected result of the detection section;
   a display process section configured to perform a process of displaying the display image formed by the image forming section; and
   an image information obtaining section configured to extract capture date and capture time information of each of the images as attribute information of each of the images,
   wherein the image forming section is configured to decide a display order of each of the images that forms the display image based on the attribute information obtained by the image information obtaining section such that multiple images are arranged along a first axis at a coordinate equal to the capture date information, and multiple images are arranged along a second axis at a coordinate equal to the capture time information, the image forming section is configured to calculate a degree of subject matter correlation of an image selected by the user with each of the images that forms the display image and form the display image based on the calculated degree of subject matter correlation, and if the display image has been formed in such a manner that each of the images that forms the display image has been permitted to overlap and each of the images that forms the display image overlaps, the image forming section performs a process of moving an image having a higher degree of subject matter correlation with the selected image to a foreground plane of a screen of the display section.

2. The image display apparatus as set forth in claim 1, further comprising:
   a display section configured to display the display image under a control of the display process section, wherein the display section is a display area larger than a field of view in the user's watching state.

3. The image display apparatus as set forth in claim 2, wherein the image forming section is configured to set up a size of each of images that forms the display image for a size reversely proportional to a distance between a watching position of the user and the display section.

4. The image display apparatus as set forth in claim 2, wherein the image forming section is configured to assign two different parameters about the images to a vertical direction and a horizontal direction of the display image, respectively, so as to form the display image.

5. The image display apparatus as set forth in claim 3, wherein the image forming section is configured to change the size of each of the images that forms the display image based on an image selected by the user.

6. The image display apparatus as set forth in claim 5, wherein if the display image has been formed in such a manner that each of the images that forms the display image has been permitted to overlap and each of the images that forms the display screen overlaps, when the size of each of the images is enlarged, the image forming section performs a process of causing each of the images not to overlap.

7. The image display apparatus as set forth in claim 5, wherein the detection section is configured to detect a position of a line of sight of the user and determines the image arranged at the position of the line of sight to be an image selected by the user.

8. The image display apparatus as set forth in claim 1, wherein the image forming section is configured to form the display image such that each of the images is arranged in an order of higher degrees of subject matter correlation.

9. The image display apparatus as set forth in claim 1, wherein the image forming section is configured to perform a process of highlighting an image determined to have a higher degree of subject matter correlation with the selected image.

10. The image display apparatus as set forth in claim 9, wherein the image forming section is configured to perform a process of moving an image determined to have a higher degree of subject matter correlation with the selected image to a vicinity thereof.

11. The image display apparatus as set forth in claim 1, wherein the image information obtaining section is configured to obtain photographer information of each of the images as the attribute information, and
wherein the image forming section is configured to form the display image such that the images are distinguished by photographers based on the photographer information obtained by the image information obtaining section.

12. The image display apparatus as set forth in claim 1, wherein the degree of subject matter correlation is calculated by comparing a feature amount extracted from the selected image and a feature amount extracted from each of the images that forms the display image.

13. The image display apparatus as set forth in claim 1, wherein the image forming section is configured to perform an image recognition process for an image of a prepared object as a standard pattern to calculate the degree of subject matter correlation of the selected image with each of the images that forms the display image.

14. The image display apparatus as set forth in claim 1, wherein the image forming section performs a process of moving the image having the higher degree of subject matter correlation with the selected image to be foreground plane such that the image having the higher degree of subject matter correlation does not overlap with the selected image.

15. An image display method, comprising:
- detecting a user's watching state;
- extracting capture date and capture time information of each of the images as attribute information of each of the images;
- forming a display image that is displayed on a screen based on a plurality of images and changing the display image based on a detected result of the detection section, the forming including deciding a display order of each of the images that forms the display image based on the attribute information obtained by the image information obtaining section such that multiple images are arranged along a first axis at a coordinate equal to the capture date information, and multiple images are arranged along a second axis at a coordinate equal to the capture time information;
- calculating a degree of subject matter correlation of an image selected by the user with each of the images that forms the display image and forming the display image based on the calculated degree of subject matter correlation;
- performing a process of moving an image having a higher degree of subject matter correlation with the selected image to a foreground plane of the display image if the display image has been formed in such a manner that each of the images that forms the display image has been permitted to overlap and each of the images that forms the display image overlaps; and
- performing a process of displaying the display image that has been formed.

16. The image display method as set forth in claim 15, further comprising:
- moving the image having the higher degree of subject matter correlation with the selected image to be foreground plane such that the image having the higher degree of subject matter correlation does not overlap with the selected image.

17. A non-transitory computer readable record medium on which a program has been recorded, the program causing a computer to execute a method comprising:
- detecting a user's watching state;
- extracting capture date and capture time information of each of the images as attribute information of each of the images;
- forming a display image that is displayed on a screen based on a plurality of images and changing the display image based on a detected result of the detection section, the forming including deciding a display order of each of the images that forms the display image based on the attribute information obtained by the image information obtaining section such that multiple images are arranged along a first axis at a coordinate equal to the capture date information, and multiple images are arranged along a second axis at a coordinate equal to the capture time information;
- calculating a degree of subject matter correlation of an image selected by the user with each of the images that forms the display image and forming the display image based on the calculated degree of subject matter correlation;
- performing a process of moving an image having a higher degree of subject matter correlation with the selected image to a foreground plane of the display image if the display image has been formed in such a manner that each of the images that forms the display image has been permitted to overlap and each of the images that forms the display image overlaps; and
- performing a process of displaying the display image that has been formed.

\* \* \* \* \*